(12) United States Patent
Nishio et al.

(10) Patent No.: US 11,916,389 B2
(45) Date of Patent: Feb. 27, 2024

(54) GRID INTERCONNECTION SYSTEM, INTERCONNECTION CONTROL DEVICE AND GRID INTERCONNECTION METHOD

(71) Applicant: DAIHEN Corporation, Osaka (JP)

(72) Inventors: Ryuhei Nishio, Osaka (JP); Akihiro Ohori, Osaka (JP); Nobuyuki Hattori, Osaka (JP); Koji Matsunaga, Osaka (JP)

(73) Assignee: DAIHEN Corporation, Osaka (JP)

( * ) Notice: Subject to any disclaimer, the term of this patent is extended or adjusted under 35 U.S.C. 154(b) by 634 days.

(21) Appl. No.: 17/257,694

(22) PCT Filed: Jun. 27, 2019

(86) PCT No.: PCT/JP2019/025511
§ 371 (c)(1),
(2) Date: Jan. 4, 2021

(87) PCT Pub. No.: WO2020/026656
PCT Pub. Date: Feb. 6, 2020

(65) Prior Publication Data
US 2021/0273453 A1 Sep. 2, 2021

(30) Foreign Application Priority Data

Aug. 2, 2018 (JP) ................................ 2018-146044

(51) Int. Cl.
*H02J 3/32* (2006.01)
*B60L 50/50* (2019.01)
(Continued)

(52) U.S. Cl.
CPC .............. *H02J 3/322* (2020.01); *B60L 50/50* (2019.02); *B60L 53/53* (2019.02); *B60L 55/00* (2019.02); *H02J 9/06* (2013.01)

(58) Field of Classification Search
CPC ... H02J 3/322; H02J 9/06; B60L 50/50; B60L 55/00; B60L 53/53
(Continued)

(56) References Cited

U.S. PATENT DOCUMENTS 9,559,521 B1 * 1/2017 King .......................... H02J 9/06
2010/0133900 A1 * 6/2010 King ....................... B60L 58/40
180/65.21
(Continued)

FOREIGN PATENT DOCUMENTS

CN 209088619 U * 7/2019
CN 209298960 U * 8/2019
(Continued)

OTHER PUBLICATIONS

Office Action dated Dec. 7, 2021, for Japanese Patent Application No. 2018-146044, and its English translation, 7 pages.
(Continued)

*Primary Examiner* — Suresh Memula
(74) *Attorney, Agent, or Firm* — Bret E. Field; Bozicevic, Field & Francis LLP

(57) ABSTRACT

A grid interconnection system for a power grid includes: a storage battery; a power conversion device that converts power from the storage battery into AC; and an interconnection control device that supplies power from a commercial power supply to a load and supplies power from the power conversion device to the load when the commercial power supply fails. When the commercial power supply is restored, the interconnection control device starts supply of power from the commercial power supply to the load, and stops supply of power from the power conversion device to the load after the supply of power from the commercial power supply to the load is started.

8 Claims, 23 Drawing Sheets

(51) Int. Cl.
*B60L 55/00* (2019.01)
*B60L 53/53* (2019.01)
*H02J 9/06* (2006.01)

(58) Field of Classification Search
USPC ............................................. 320/109
See application file for complete search history.

(56) References Cited

U.S. PATENT DOCUMENTS

| | | | | |
|---|---|---|---|---|
| 2014/0365792 | A1* | 12/2014 | Yun ..................... | H02J 7/00047 |
| | | | | 713/320 |
| 2015/0048797 | A1* | 2/2015 | Song .................... | G01R 31/382 |
| | | | | 320/134 |
| 2015/0132615 | A1* | 5/2015 | Yun ..................... | H01M 10/488 |
| | | | | 429/61 |
| 2018/0037121 | A1* | 2/2018 | Narla ......................... | H02J 7/35 |
| 2018/0229618 | A1* | 8/2018 | Lee ......................... | B60L 50/13 |
| 2018/0244170 | A1* | 8/2018 | Kydd ...................... | H02J 3/322 |
| 2020/0031238 | A1* | 1/2020 | Kydd ...................... | H02J 9/062 |

FOREIGN PATENT DOCUMENTS

| | | | | |
|---|---|---|---|---|
| CN | 210380354 U | * | 4/2020 | |
| CN | 210780203 U | * | 6/2020 | |
| EP | 2846395 A2 | * | 3/2015 | ............ H01M 10/48 |
| JP | H10-174450 A | | 6/1998 | |
| JP | H10-341533 A | | 12/1998 | |
| JP | 2009-254192 A | | 10/2009 | |
| JP | 2013-94026 A | | 5/2013 | |
| JP | 2013-99204 A | | 5/2013 | |
| JP | 2018-61432 A | | 4/2018 | |
| KR | 20080102721 A | * | 11/2008 | |

OTHER PUBLICATIONS

English Translation of International Search Report for PCT Application No. PCT/JP2019/025511 dated Sep. 10, 2019, 2 pages.

* cited by examiner

F I G. 3
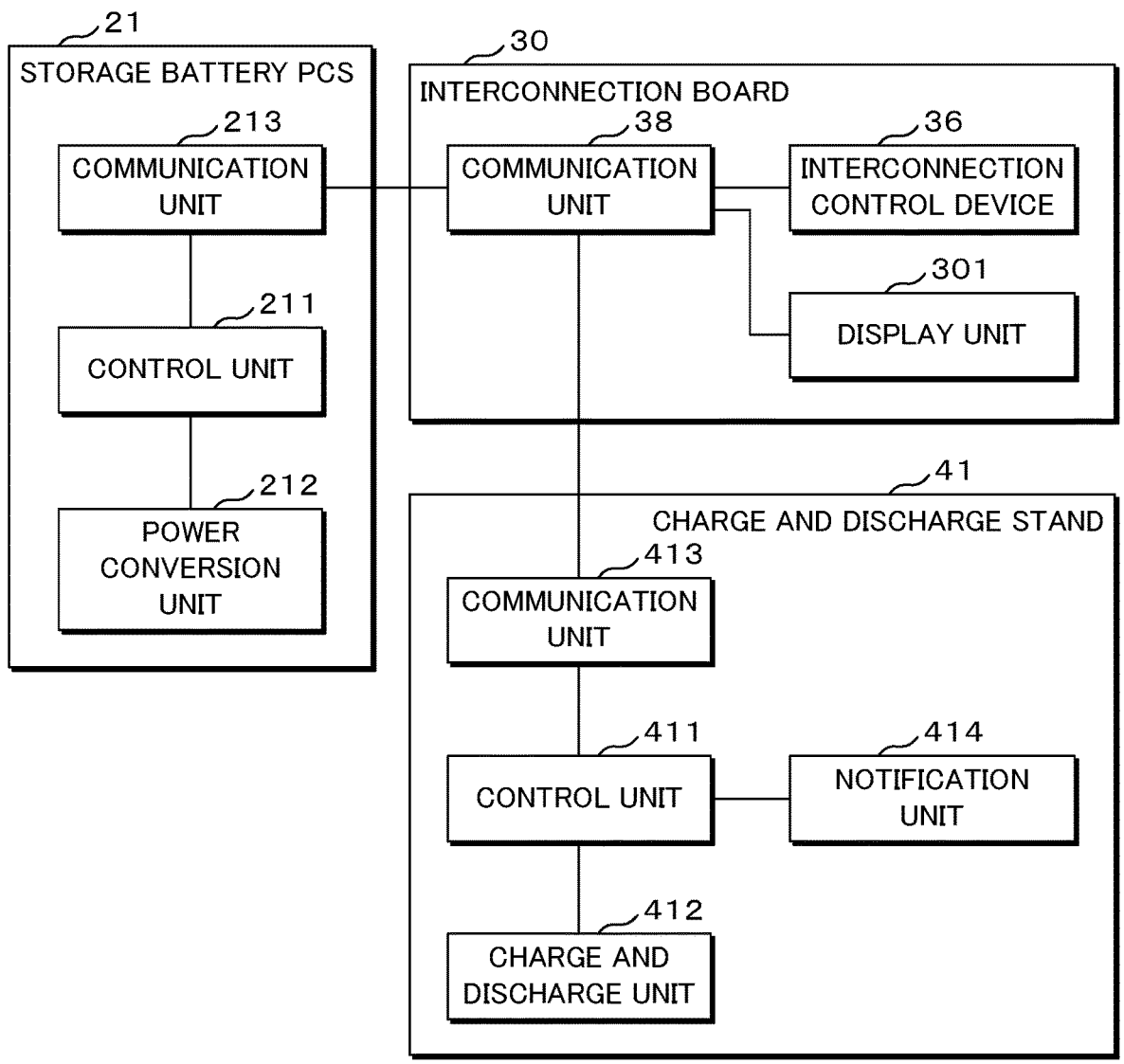

F I G. 4
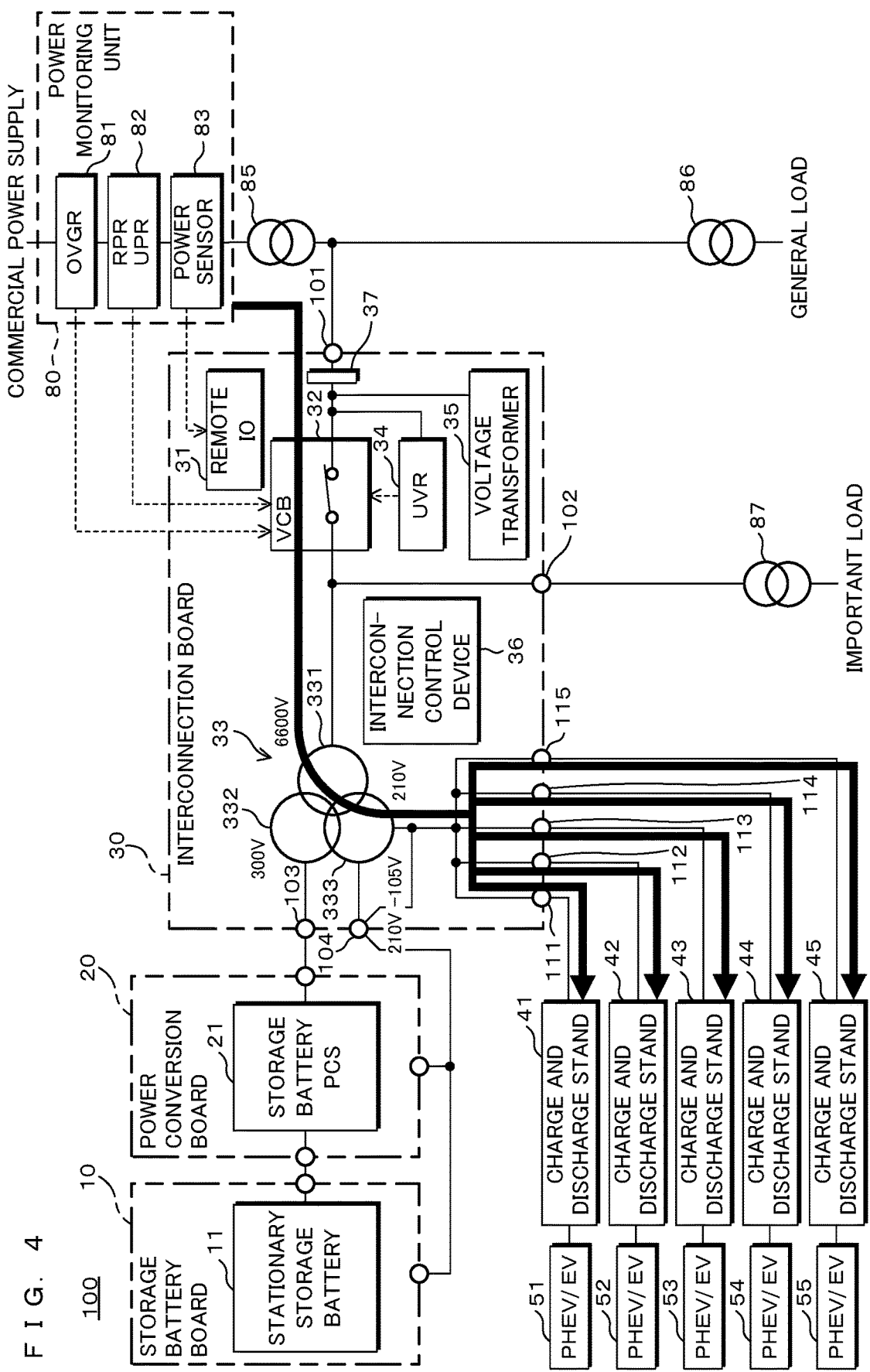

F I G. 1 6
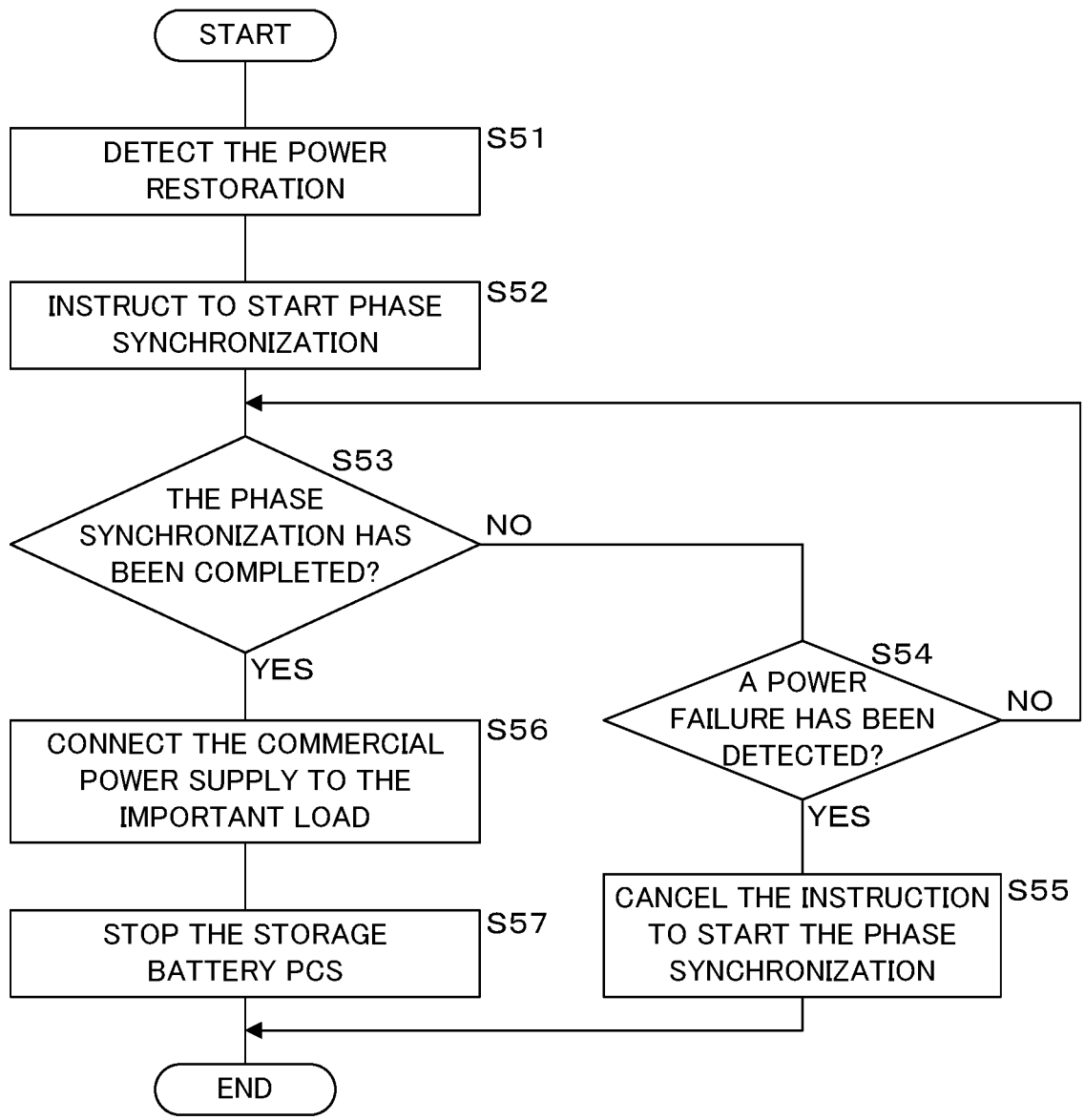

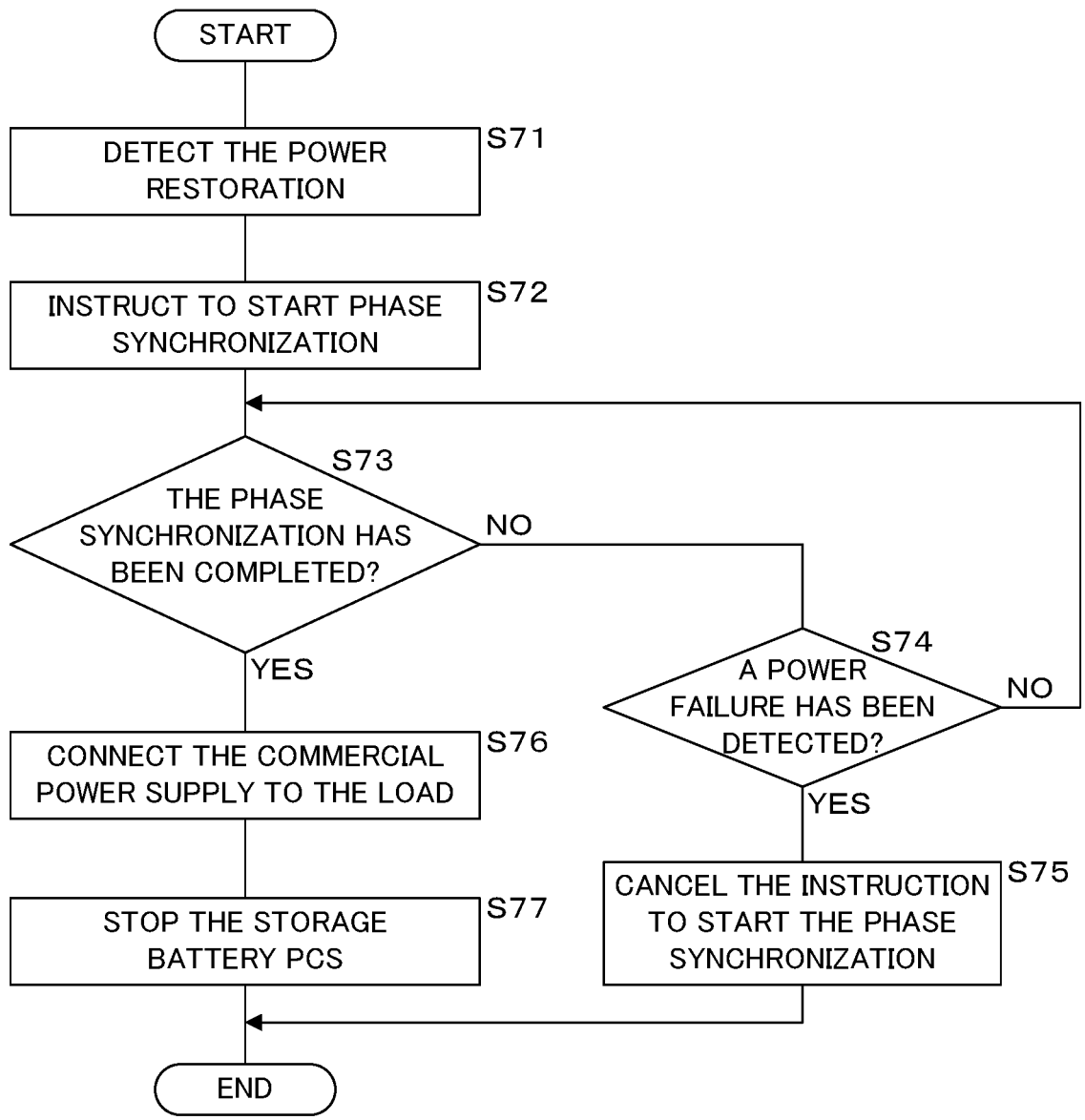

GRID INTERCONNECTION SYSTEM, INTERCONNECTION CONTROL DEVICE AND GRID INTERCONNECTION METHOD

CROSS-REFERENCE TO RELATED APPLICATIONS

This application is the national phase under 35 U. S. C. § 371 of PCT International Application No. PCT/JP2019/025511 which has an International filing date of Jun. 27, 2019 and designated the United States of America.

FIELD

The present invention relates to a grid interconnection system, an interconnection control device, and a grid interconnection method for supplying power from a storage battery in the event of a power failure and resuming the supply of power from a commercial power supply at the time of power restoration.

BACKGROUND

In the market, the transition from gasoline-powered vehicles or hybrid vehicles to electric-powered vehicles, such as plug-in hybrid electric vehicles (PHEV) or electric vehicles (EV), is in progress. Japanese Patent Laid-Open Publication No. 2018-61432 discloses a vehicle to home (V2H) device that connects such an electric-powered vehicle to an electric device used in a house so that a storage battery in the electric-powered vehicle is used as an emergency power supply in an emergency, such as a disaster.

On the other hand, a power distribution service from the storage battery to the power grid is not limited to V2H, and is expanding from general households to V2X, which is a general term for vehicle to building (V2B), vehicle to grid (V2G), or the like that is a service for larger consumers or power grids.

SUMMARY

A grid interconnection system supplies power from a storage battery to a load when a commercial power supply fails. In addition, when the commercial power supply is restored, the grid interconnection system resumes the supply of power from the commercial power supply to the load. In a conventional grid interconnection system, when the supply of power from the commercial power supply is resumed, the supply of power from the storage battery to the load is stopped, and then the supply of power from the commercial power supply to the load is started.
Therefore, there is a problem that the supply of power to the load is interrupted.

The present disclosure has been made in view of such circumstances, and it is an object to provide a grid interconnection system, an interconnection control device, and a grid interconnection method that can prevent the supply of power from being interrupted at the time of power restoration.

A grid interconnection system for a power grid according to an aspect of the present disclosure is characterized by comprising: a storage battery; a power conversion device that converts power from the storage battery into AC and an interconnection control device that supplies power from a commercial power supply to a load and supplies power from the power conversion device to the load when the commercial power supply fails. When the commercial power supply is restored, the interconnection control device starts supply of power from the commercial power supply to the load, and stops supply of power from the power conversion device to the load after the supply of power from the commercial power supply to the load is started.

In an aspect of the present disclosure, the grid interconnection system includes the storage battery, the power conversion device, and the interconnection control device. The interconnection control device supplies power from the power conversion device to the load when the commercial power supply fails. At the time of power restoration, the interconnection control device starts the supply of power from the commercial power supply to the load while supplying power from the power conversion device to the load, and then stops the supply of power from the power conversion device to the load. Therefore, at the time of power restoration, the power supply source is switched without interrupting the supply of power to the load.

In the grid interconnection system according to an aspect of the present disclosure, it is characterized in that when the commercial power supply is restored, the power conversion device synchronizes a voltage phase of power supplied from the power conversion device to the load with a voltage phase of power from the commercial power supply, and after the voltage phase of the power supplied from the power conversion device to the load is synchronized with the voltage phase of the power from the commercial power supply, the interconnection control device starts supply of power from the commercial power supply to the load.

In an aspect of the present disclosure, at the time of power restoration, the interconnection control device synchronizes the voltage phase of the power supplied from the power conversion device to the load with the voltage phase of the power from the commercial power supply, and starts the supply of power from the commercial power supply to the load after the synchronization. By performing phase synchronization, it is possible to connect the commercial power supply without giving stress, such as voltage fluctuation, to the load.

In the grid interconnection system according to an aspect of the present disclosure, it is characterized in that in order to synchronize the voltage phase of the power supplied from the power conversion device to the load with the voltage phase of the power from the commercial power supply, the power conversion device matches a frequency of the power supplied from the power conversion device to the load with a frequency of the power from the commercial power supply, and after the matching between the frequencies of the powers, the power conversion device matches a zero crossing point of the power supplied from the power conversion device to the load with a zero crossing point of the power from the commercial power supply.

In an aspect of the present disclosure, when performing phase synchronization, the power conversion device matches the frequency of the power from the power conversion device with the frequency of the power from the commercial power supply. Then, the power conversion device matches the zero crossing point of the power from the power conversion device with the zero crossing point of the power from the commercial power supply. By matching the zero crossing points after matching the frequencies of the powers with each other, the occurrence of phase jump can be suppressed and the voltage phase of the power from the power conversion device and the voltage phase of the power from the commercial power supply can be synchronized with each other.

In the grid interconnection system according an aspect of the present disclosure, it is characterized in that the power conversion device determines whether or not a voltage and a frequency of the power from the commercial power supply are within a predetermined range, when the voltage and the frequency are within the predetermined range, the power conversion device synchronizes the voltage phase of the power supplied from the power conversion device to the load with the voltage phase of the power from the commercial power supply, and when the voltage or the frequency is not within the predetermined range, the power conversion device waits for a process for phase synchronization and continues supply of power to the load.

In an aspect of the present disclosure, the power conversion device performs phase synchronization when the voltage and the frequency of the power from the commercial power supply are within the predetermined range. When the voltage or the frequency is not within the predetermined range, the power conversion device does not perform phase synchronization and continues the supply of power to the load. Since the supply of power from the commercial power supply in an unstable state to the load is prevented, the stable power supply from the power conversion device to the load is continued.

The grid interconnection system according to an aspect of the present disclosure is characterized by further comprising: a charge and discharge stand for an electric-powered vehicle. When the commercial power supply fails, the interconnection control device supplies power from the power conversion device and the charge and discharge stand to the load.

In an aspect of the present disclosure, the grid interconnection system further includes a charge and discharge stand for an electric-powered vehicle. In the event of a power failure, the interconnection control device supplies power from the power conversion device and the charge and discharge stand to the load. It becomes possible to use the electric-powered vehicle as an emergency power supply.

In the grid interconnection system according to an aspect of the present disclosure, it is characterized in that when the commercial power supply fails, the interconnection control device supplies power from the power conversion device to a specific load, and when the commercial power supply is restored, the interconnection control device starts supply of power from the commercial power supply to the specific load.

In an aspect of the present disclosure, the grid interconnection system supplies power to the specific load in the event of a power failure, and switches the power supply source for the specific load to the commercial power supply without interrupting the supply of power at the time of power restoration. By mainly supplying power to an important specific load, such as an emergency elevator, it is possible to minimize power to be supplied in the event of a power failure of the commercial power supply and prolong the time during which power can be supplied.

In an interconnection control device according to an aspect of the present disclosure, which performs control to supply power from a storage battery to a load when a commercial power supply fails, it is characterized in that when the commercial power supply is restored, the interconnection control device starts supply of power from the commercial power supply to the load, and stops supply of power from the storage battery after the supply of power from the commercial power supply to the load is started.

In an aspect of the present disclosure, when the commercial power supply fails, the interconnection control device supplies power from the storage battery to the load. At the time of power restoration, the interconnection control device starts the supply of power from the commercial power supply to the load while supplying power from the storage battery to the load, and then stops the supply of power from the storage battery. Therefore, at the time of power restoration, the power supply source is switched without interrupting the supply of power to the load.

A grid interconnection method for a power grid according to an aspect of the present disclosure is characterized by comprising: by using a storage battery and a power conversion device for converting power from the storage battery into AC, supplying power from a commercial power supply to a load; supplying power from the power conversion device to the load when the commercial power supply fails; causing the power conversion device to synchronize a voltage phase of power supplied from the power conversion device to the load with a voltage phase of power from the commercial power supply when the commercial power supply is restored; starting supply of power from the commercial power supply to the load after the voltage phase of the power supplied from the power conversion device to the load is synchronized with the voltage phase of the power from the commercial power supply; and stopping the supply of power from the power conversion device to the load after the supply of power from the commercial power supply to the load is started.

In an aspect of the present disclosure, using the storage battery and the power conversion device, power is supplied from the power conversion device to the load when the commercial power supply fails. At the time of power restoration, the supply of power from the commercial power supply to the load is started while the power is being supplied from the power conversion device to the load, and then the supply of power from the power conversion device to the load is stopped. Therefore, at the time of power restoration, the power supply source is switched without interrupting the supply of power to the load.

The present disclosure shows excellent effects, such as being able to resume the supply of power from the commercial power supply to the load without interrupting the supply of power to the load when the commercial power supply is restored.

The above and further objects and features will more fully be apparent from the following detailed description with accompanying drawings.

BRIEF DESCRIPTION OF THE DRAWINGS

FIG. 3 is a block diagram illustrating an example of a communication connection mode of an interconnection board, a storage battery PCS, and a charge and discharge stand, and internal configuration examples of the storage battery PCS and the charge and discharge stand according to the first embodiment;

FIG. 4 is a schematic diagram illustrating a first example of grid interconnection by the grid interconnection system according to the first embodiment when a power grid is normal;

FIG. 16 is a flowchart illustrating an example of the procedure of a process performed by the grid interconnection system according to the second embodiment at the time of power restoration;

FIG. 23 is a flowchart illustrating an example of the procedure of a process performed by the grid interconnection system according to the third embodiment at the time of power restoration.

DETAILED DESCRIPTION

Hereinafter, the present disclosure will be specifically described with reference to the diagrams illustrating embodiments thereof.

First Embodiment

Figure 1:
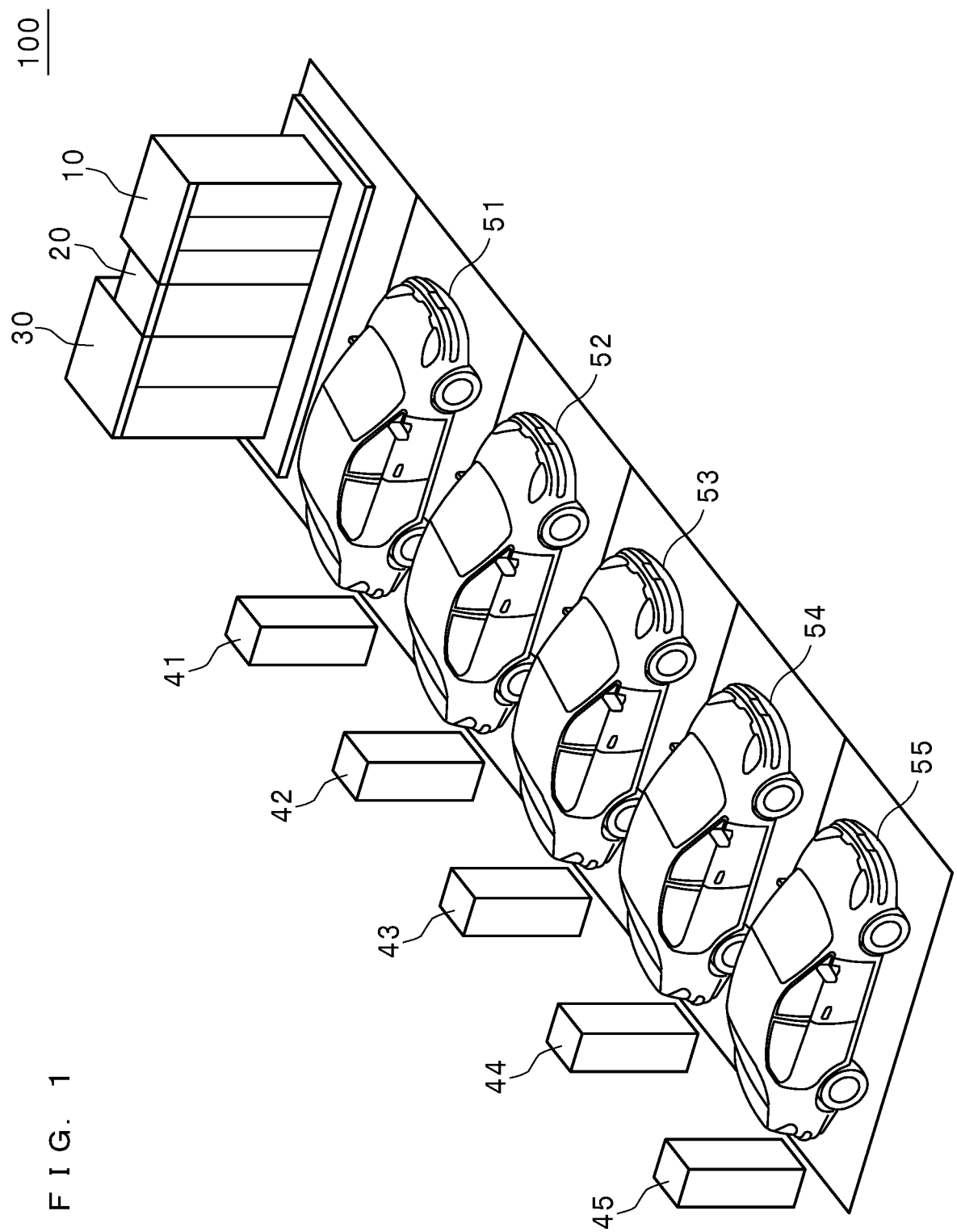
FIG. 1 is a schematic view illustrating an example of the appearance configuration of a grid interconnection system according to a first embodiment.

FIG. 1 is a schematic view illustrating an example of the appearance configuration of a grid interconnection system 100 according to a first embodiment. In the example of FIG. 1, the grid interconnection system 100 is installed in a parking lot, and the parking lot has a parking space for five cars. The grid interconnection system 100 includes charge and discharge stands 41, 42, 43, 44, and 45 installed in the parking lot for electric-powered vehicles (51, 52, 53, 54, and 55) and a grid interconnection unit installed in the parking lot. The grid interconnection system 100 can be provided as a device for a business continuity plan (BCP). The grid interconnection unit includes a storage battery board 10 in which a storage battery is housed, a power conversion board 20 in which a storage battery power conditioning system (PCS) is housed, and an interconnection board 30 in which an interconnection control device for grid interconnection with a power grid is housed. Incidentally, the number of charge and discharge stands is not limited to five. The storage battery, the storage battery PCS, and the interconnection control device are not illustrated in FIG. 1. The storage battery PCS corresponds to a power conversion device.

The electric-powered vehicle is a plug-in hybrid electric vehicle (PHEV) or an electric vehicle (EV), and is also referred to as a PHEV or an EV in this specification. The charge and discharge stands 41 to 45 can charge and discharge the battery (vehicle-mounted storage battery) mounted on the electric-powered vehicle. The storage battery PCS housed in the power conversion board 20 can convert power in both directions of AC (alternating current) to DC (direct current) and DC to AC, so that it is possible to charge and discharge the storage battery housed in the storage battery board 10. When the power grid is normal, the interconnection control device housed in the interconnection board 30 performs a grid interconnection operation among the power grid, the storage battery PCS, and the charge and discharge stands 41 to 45.

The interconnection control device enables an independent operation by the storage battery PCS and the charge and discharge stands 41 to 45 when the power grid is abnormal due to a disaster or the like, for example, in the event of a power failure. Even if all or some of electric-powered vehicles are not parked in the parking lot, the grid interconnection unit can supply the required power to the load of the power grid by supplying the power of the storage battery to the load using the storage battery PCS. Loads are various electric devices. For example, the load is an electric device provided in a facility where a parking lot is installed.

Figure 2:
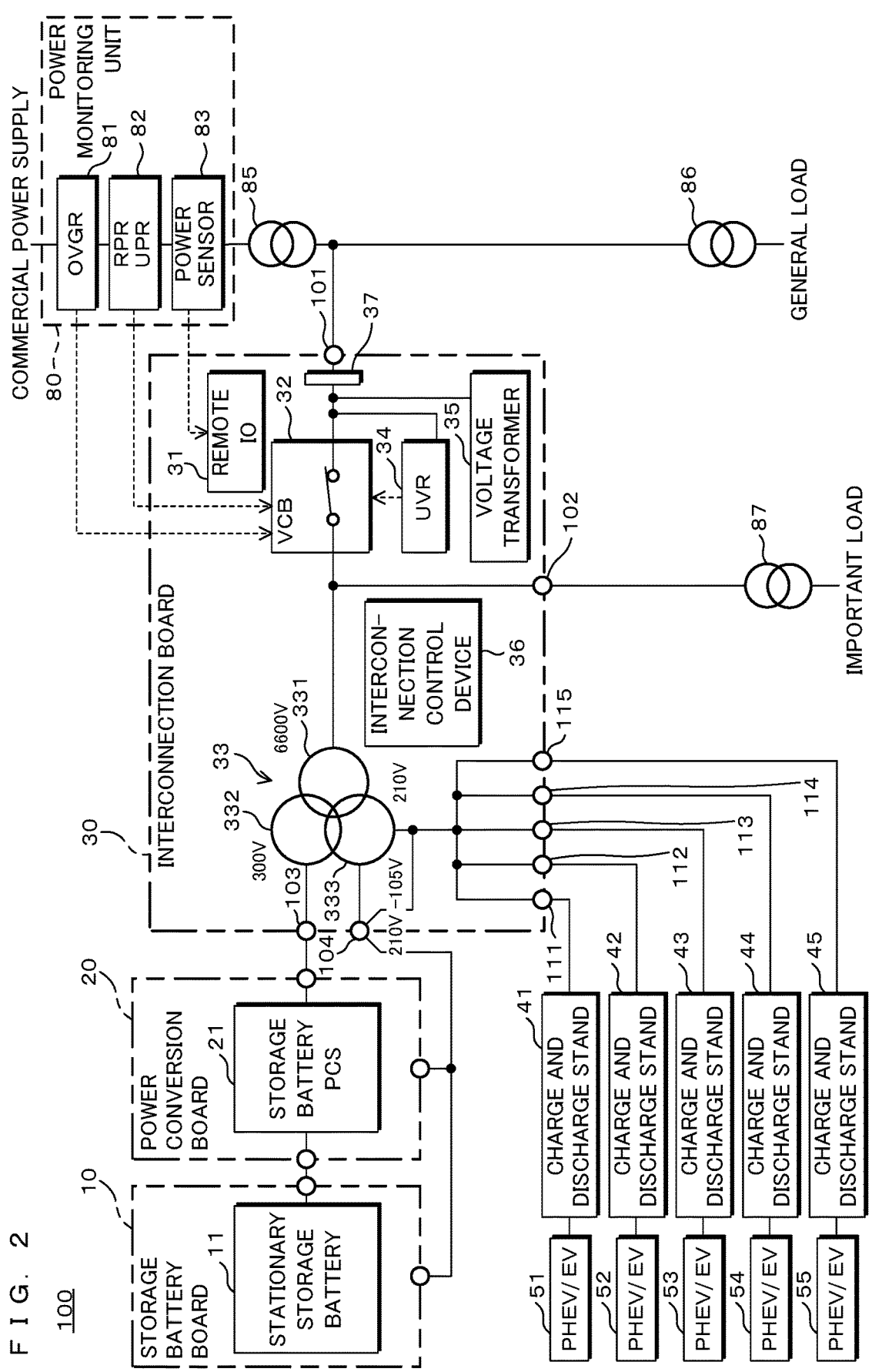
FIG. 2 is a schematic diagram illustrating an example of the circuit configuration of the grid interconnection system according to the first embodiment.

FIG. 2 is a schematic diagram illustrating an example of the circuit configuration of the grid interconnection system 100 according to the first embodiment. A stationary storage battery 11, a control device (not illustrated), a cooling device, a heating device, and the like are housed in the storage battery board 10. A storage battery PCS 21 and a cooling device (not illustrated) for heat dissipation of the storage battery PCS 21 are housed in the power conversion board 20. The storage battery PCS 21 includes a control device (not illustrated), a cooling device, and the like. The interconnection board 30 includes an interconnection control device 36, a remote IO 31, a vacuum circuit breaker (VCB) 32 as an opening and closing unit, a transformer 33, an under voltage relay (UVR) 34, a voltage transformer 35, and the like.

The interconnection board 30 includes terminal blocks 101 and 102, a disconnector 37, and breakers 103, 104, and 111 to 115. The terminal block 101 is provided on the electric line (high voltage power supply line) on the high voltage lead-in side. That is, a power line from the secondary side of a step-down transformer 85 of the power grid and a power line from the primary side of a step-down transformer 86 connected to a general load are connected to the terminal block 101. The step-down transformer 85 is connected to a commercial power supply and steps down the voltage from the commercial power supply. Examples of the general load include an electric device that relatively less affects others even if power is cut off in the event of a disaster.

The terminal block 102 is provided on the electric line (high voltage power supply line) on the high voltage drawer side. That is, a power line from the primary side of a step-down transformer 87 connected to an important load is connected to the terminal block 102. Here, the important load is a load to which power needs to be continuously supplied even in the event of an abnormality, such as a disaster. Examples of the important load include an emergency elevator, an electric device that needs to be continuously operated, building lighting, or air conditioning equipment.

One electrode of the VCB 32, the UVR 34, and the voltage transformer 35 are connected to the terminal block 101 through the disconnector 37. The VCB 32 is a circuit breaker of which electrodes are housed in a high vacuum container and which extinguishes arc by diffusing substances, which make up an arc discharge occurring between the electrodes when a current is cut off, in a high vacuum.

The voltage transformer 35 measures the voltage and frequency of power from the commercial power supply, and inputs the measured value to the UVR 34. The UVR 34 can detect an abnormality, such as a short circuit accident on the power grid side and a power failure. When an abnormality is detected, the UVR 34 outputs a control signal to the VCB 32 to cut off the electric line of the VCB 32.

In addition, a power monitoring unit 80 for monitoring the power on the primary side of the step-down transformer 85 is provided in a building for which power demand management is performed using the grid interconnection system. Incidentally, the power monitoring unit 80 is not always essential. In addition, when the step-down transformer 85 is not installed, the location monitored by the power monitoring unit 80 is appropriately set. The power monitoring unit 80 includes an over voltage ground relay (OVGR) 81, a reverse power relay (RPR)/an under power relay (UPR) 82, and a power sensor 83. The OVGR 81 continuously detects ground faults in the power grid. The RPR/UPR 82 can detect an abnormality, such as reverse power flow to the power grid side or a short circuit accident. Even when an abnormality is detected by the OVGR 81 or the RPR/UPR 82, the electric line of the VCB 32 is cut off.

The remote IO 31 is an AD converter that converts the power (analog value) detected by the power sensor 83 into a digital value. The remote IO 31 outputs the converted power (digital value) to the interconnection control device 36.

The transformer 33 (more specifically, a first winding 331) is connected to the other electrode of the VCB 32 through the electric line. The transformer 33 includes the first winding 331, a second winding 332 connected to the breaker 103 through the electric line, and a third winding 333 connected to the breakers 111 to 115 through the electric line.

That is, the transformer 33 can be a three-phase three-winding transformer. The voltage and the power (apparent power) on the first winding 331 side can be, for example, 6600 V and 50 kVA, respectively. The voltage and the power on the second winding 332 side can be, for example, 300 V and 50 kVA, respectively. The voltage and the power on the third winding 333 side can be, for example, 210 V and 50 kVA, respectively. The voltage and the power are not limited to these values. By using the transformer 33 as a three-winding transformer, it is possible to save the space and reduce the weight as compared with a case where two transformers are provided.

The storage battery PCS 21 is connected to the breaker 103. The storage battery PCS 21 can convert power in both directions of AC to DC and DC to AC, so that it is possible to charge and discharge the stationary storage battery 11.

The electric line of one phase of the three phases of the third winding 333 is connected to the breaker 104. For example, a voltage of 105 V to 210 V is supplied as a power supply for the control device and the cooling device included in the storage battery PCS 21, and further as a power supply for the control device, the cooling device, and the heating device in the storage battery board 10.

Power lines from the charge and discharge stands 41 to 45 are connected to the breakers 111 to 115. The charge and discharge stands 41 to 45 include conversion circuits capable of converting power in both directions of AC to DC and DC to AC, so that it is possible to charge and discharge the batteries mounted in the electric-powered vehicles 51 to 55.

FIG. 3 is a block diagram illustrating a communication connection mode of the interconnection board 30, the storage battery PCS 21, and the charge and discharge stand 41, and internal configuration examples of the storage battery PCS 21 and the charge and discharge stand 41 according to the first embodiment. The interconnection board 30 includes a communication unit 38 that communicates with the storage battery PCS 21 and the charge and discharge stand 41. The communication unit 38 is connected to the interconnection control device 36 by a communication line. In addition, the communication unit 38 is connected to the storage battery PCS 21 and the charge and discharge stand 41 by a communication line. The interconnection control device 36 transmits and receives signals to and from the storage battery PCS 21 and the charge and discharge stand 41 through the communication unit 38.

The storage battery PCS 21 includes a control unit 211, a power conversion unit 212, and a communication unit 213. The control unit 211 controls the operation of each unit of the storage battery PCS 21. The power conversion unit 212 performs conversion from AC to DC and conversion from DC to AC. The communication unit 213 is connected to the communication unit 38 by a communication line. The storage battery PCS 21 transmits and receives signals to and from the interconnection control device 36 through the communication unit 213. In addition, the interconnection board 30 includes a display unit 301. For example, the display unit 301 is a display. The display unit 301 displays information regarding the operations of the storage battery PCS 21 and the charge and discharge stand 41 and information of the voltage of the commercial power supply and the like.

The charge and discharge stand 41 includes a control unit 411, a charge and discharge unit 412, a communication unit 413, and a notification unit 414. The control unit 411 controls the operation of each unit of the charge and discharge stand 41. The charge and discharge unit 412 performs charge and discharge of the battery of the electric-powered vehicle 51. The communication unit 413 is connected to the communication unit 38 by a communication line. The charge and discharge stand 41 transmits and receives signals to and from the interconnection control device 36 through the communication unit 413.

The notification unit 414 provides notification of information regarding the charge and discharge of the battery of the electric-powered vehicle 51. The notification unit 414 may be, for example, a display panel or an indicator light, or may provide notification to a terminal device used by a user, an administrator, or the like through radio communication. The information regarding charge and discharge can include, for example, information of operating conditions such as charge or discharge being prepared, preparation completed, being charged or discharged, and charge or discharge completed, battery state of charge (SOC), time required for full charge, remaining time until full charge, dischargeable amount, and fee related to charge or discharge. Therefore, it is possible to obtain information regarding the charge and discharge of the electric-powered vehicle in a timely manner.

The configurations of the charge and discharge stands 42 to 45 are the same as the configurations of the charge and discharge stand 41. Similar to the charge and discharge stand 41, each of the charge and discharge stands 42 to 45 is connected to the communication unit 38 by a communication line. The communication units 38, 213, and 413 and communication units included in the charge and discharge stands 42 to 45 are, for example, gateways.

Next, the grid interconnection method in the grid interconnection system 100 according to the first embodiment will be described. FIG. 4 is a schematic diagram illustrating a first example of grid interconnection by the grid interconnection system 100 according to the first embodiment when the power grid is normal. FIG. 4 illustrates the flow of a part of power by arrows.

When the power grid is normal and a charge mode is set, the interconnection control device 36 supplies power from the commercial power supply to the charge and discharge stands 41 to 45, and the electric-powered vehicle 51 to 55 can be charged by the charge and discharge stands 41 to 45. Therefore, the grid interconnection system 100 can be used as a quick charge stand for electric-powered vehicles.

In addition, although not illustrated, when the power grid is normal, power is supplied from the commercial power supply to the important load. In addition, when the power grid is normal, power is supplied from the commercial power supply to the general load.

By dividing the load of the power grid into two systems of a general load and an important load, the power to be supplied in the event of an abnormality, such as a disaster, can be minimized to continuously supply power to the important load, and the time during which power can be supplied to the important load can be extended. The important load corresponds to a specific load.

Figure 5:
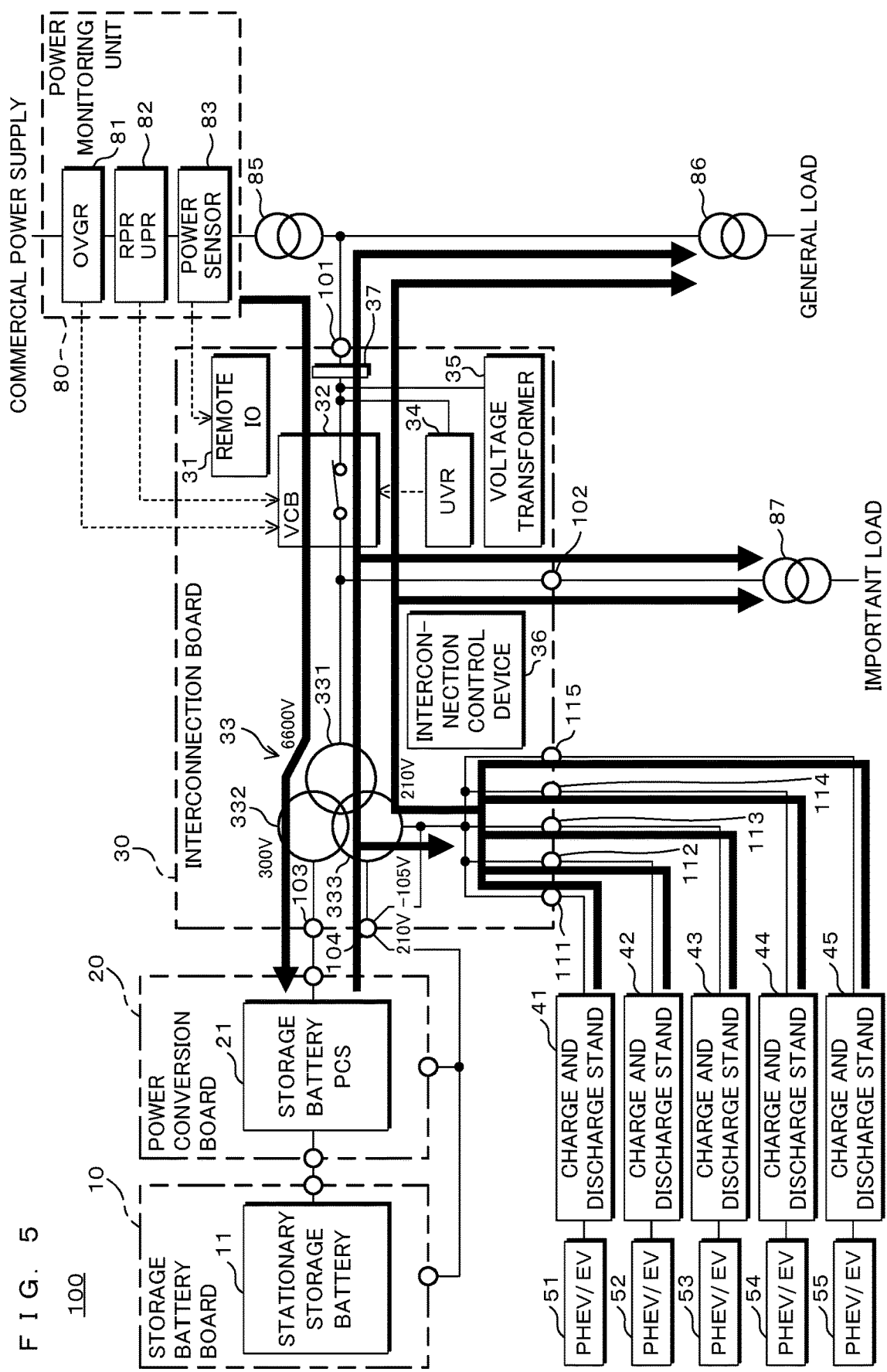
FIG. 5 is a schematic diagram illustrating a second example of grid interconnection by the grid interconnection system according to the first embodiment when a power grid is normal.

FIG. 5 is a schematic diagram illustrating a second example of grid interconnection by the grid interconnection system 100 according to the first embodiment when the power grid is normal. FIG. 5 illustrates the flow of a part of power by arrows. When the power grid is normal and the power receiving point power at a predetermined location is equal to or greater than a threshold value in a state in which an energy management mode is set, for example, when the power detected by the power sensor 83 is equal to or greater than a threshold value, the interconnection control device 36 supplies power from the charge and discharge stands 41 to 45 to the important load and the general load so that the receiving point power becomes equal to or less than the threshold value. Alternatively, the interconnection control device 36 causes the storage battery PCS 21 to supply power to the important load and the general load. This enables peak cut operation of power. Incidentally, when the power receiving point power at the predetermined location is equal to or less than a threshold value, power can be supplied from the power grid to the charge and discharge stands 41 to 45 or the storage battery PCS 21 within a range not exceeding the threshold value.

Figure 6:
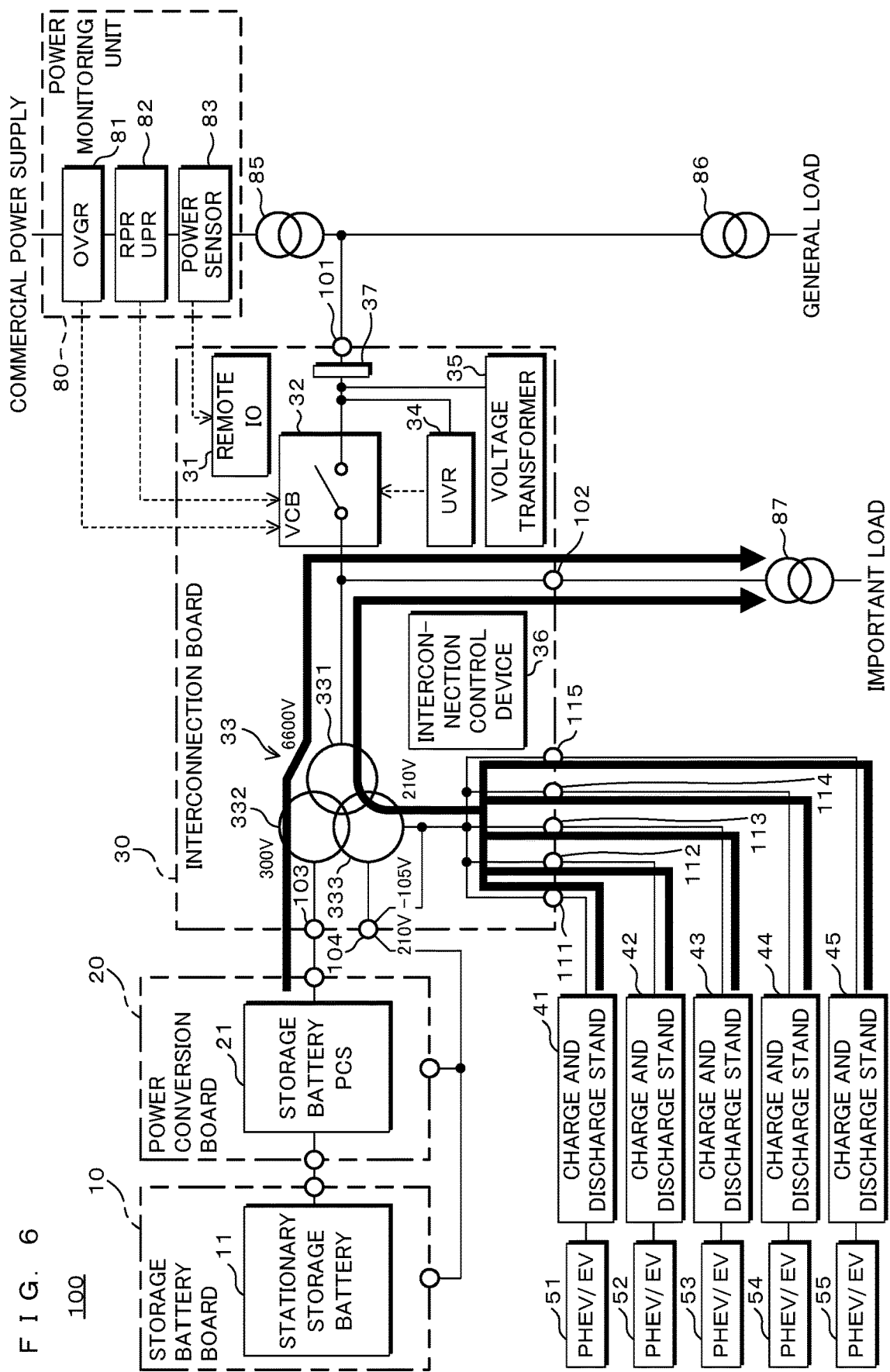
FIG. 6 is a schematic diagram illustrating an example of an independent operation in an emergency by the grid interconnection system according to the first embodiment.

FIG. 6 is a schematic diagram illustrating an example of an independent operation in an emergency by the grid interconnection system 100 according to the first embodiment. FIG. 6 illustrates the flow of power by arrows. When the power grid is abnormal, that is, when the commercial power supply fails, the interconnection control device 36 cuts off the electric line of the VCB 32 to disconnect the commercial power supply from the important load. In this state, by supplying power from the charge and discharge stands 41 to 45 or the storage battery PCS 21, an independent operation by the interconnection control device 36 becomes possible. When the power grid is abnormal, the interconnection control device 36 can supply power from at least either the charge and discharge stands 41 to 45 or the storage battery PCS 21 to the important load.

Figure 7:
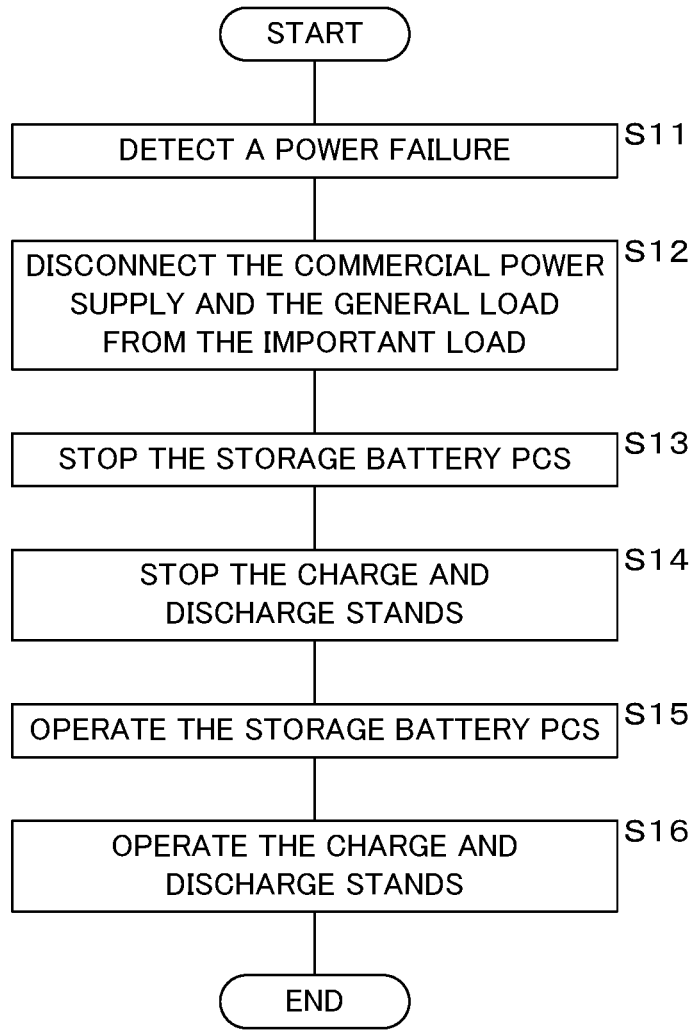
FIG. 7 is a flowchart illustrating an example of the procedure of a process for starting the independent operation by the grid interconnection system according to the first embodiment in the event of a power failure.

FIG. 7 is a flowchart illustrating an example of the procedure of a process for starting the independent operation by the grid interconnection system 100 according to the first embodiment in the event of a power failure. Hereinafter, the step is abbreviated as S. The UVR 34 detects a power failure of the commercial power supply based on a voltage from the commercial power supply (S11). When the voltage from the commercial power supply measured by the voltage transformer 35 is input and the input voltage falls below a predetermined voltage, the UVR 34 detects a power failure of the commercial power supply and outputs a control signal for cutting off the electric line to the VCB 32. In response to the control signal, the VCB 32 cuts off the electric line so that the grid interconnection system 100 disconnects the commercial power supply and the general load from the important load (S12).

Then, the interconnection control device 36 stops the storage battery PCS 21 (S13). In S13, the interconnection control device 36 outputs a control signal for stopping to the storage battery PCS 21, and the storage battery PCS 21 stops in response to the control signal. Then, the interconnection control device 36 stops the charge and discharge stands 41 to 45 (S14). In S14, the interconnection control device 36 outputs a control signal for stopping to the charge and discharge stands 41 to 45, and the charge and discharge stands 41 to 45 stop in response to the control signal. When the commercial power supply fails, the storage battery PCS 21 and the charge and discharge stands 41 to 45 may have stopped by themselves due to some error. In S13 and S14, even when the storage battery PCS 21 or the charge and discharge stands 41 to 45 stop by themselves, the interconnection control device 36 outputs a control signal for stopping to stop the storage battery PCS 21 and the charge and discharge stands 41 to 45 reliably.

Then, the interconnection control device 36 operates the storage battery PCS 21 (S15). In S15, the interconnection control device 36 outputs a control signal for starting an operation in the independent operation mode to the storage battery PCS 21, and the storage battery PCS 21 starts the operation in response to the control signal. Thereafter, the first storage battery PCS 21 operates independently. The interconnection control device 36 receives signals indicating the detection of a power failure by the UVR 34, the cut-off of the electric line by the VCB 32, and the stopping of the storage battery PCS 21. After receiving all of these signals, the interconnection control device 36 performs the processing of S15. Due to the storage battery PCS 21 that starts operating, power for control is supplied from the storage battery PCS 21 to the charge and discharge stands 41 to 45.

Then, the interconnection control device 36 operates the charge and discharge stands 41 to 45 (S16). In S16, the interconnection control device 36 outputs a control signal for starting an operation to the charge and discharge stands 41 to 45, and the charge and discharge stands 41 to 45 start the operation in response to the control signal. Then, the grid interconnection system 100 ends the process of starting the independent operation.

After the grid interconnection system 100 starts the independent operation, power is supplied from the storage battery PCS 21 and the charge and discharge stands 41 to 45 to the important load as illustrated in FIG. 6. When the interconnection control device 36 performs an independent operation, the storage battery PCS 21 performs voltage control to operate as a voltage source. The current required to obtain the required power is realized by connecting the charge and discharge stands 41 to 45 to the storage battery PCS 21, which operates as a voltage source, so as to operate as a current source. Even when the required power cannot be supplied from the charge and discharge stands 41 to 45 to the important load in the event of a power failure, the power can be supplied from the storage battery PCS 21 to the important load. Therefore, the grid interconnection system 100 as a whole can supply the required power to the important load of the power grid.

More specifically, when the power grid is abnormal and the power that can be supplied from the charge and discharge stands 41 to 45 exceeds the capacity of the important load, the interconnection control device 36 supplies surplus power from the charge and discharge stands 41 to 45 to the storage battery PCS 21. Therefore, when the electric-powered vehicle is parked in the parking space, the power of the electric-powered vehicle can be effectively used.

In addition, when the power grid is abnormal and the power that can be supplied from the charge and discharge stands 41 to 45 is less than the capacity of the important load, the interconnection control device 36 supplies power from both the charge and discharge stands 41 to 45 and the storage battery PCS 21 to the important load. For example, when the capacity of the important load is 50 kVA and the total power of 30 kVA can be supplied from the charge and discharge stands 41 to 45, the power of 20 kVA is supplied from the storage battery PCS 21, so that the power of 50 kVA is supplied from the high voltage side of the transformer 33 to the important load. When the capacity of the important load changes, only the power suitable for the capacity of the important load can be supplied. Therefore, when all or some of the required number of electric-powered vehicles are not parked in the parking space, the insufficient power can be supplied from the storage battery PCS 21, so that the required power can be supplied to the important load of the power grid.

Figure 8:
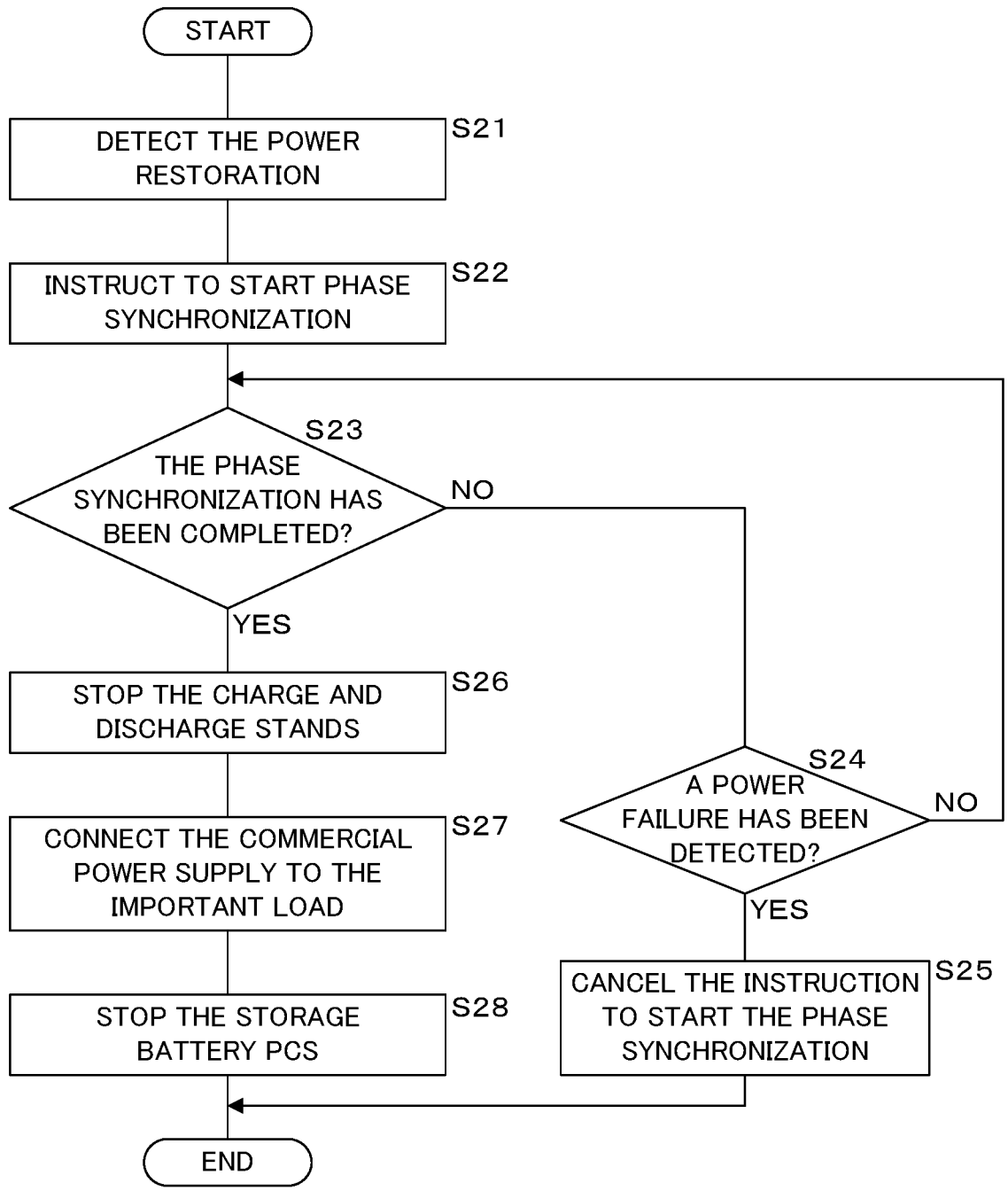
FIG. 8 is a flowchart illustrating an example of the procedure of a process performed by the grid interconnection system according to the first embodiment at the time of power restoration.

When the commercial power supply is restored from the power failure state, the grid interconnection system 100 resumes the supply of power from the commercial power supply to the important load. FIG. 8 is a flowchart illustrating an example of the procedure of a process performed by the grid interconnection system 100 according to the first embodiment at the time of power restoration. The UVR 34 detects the power restoration of the commercial power supply based on a voltage from the commercial power supply (S21). When the voltage from the commercial power supply measured by the voltage transformer 35 is input and the input voltage exceeds a predetermined voltage, the UVR 34 detects the power restoration of the commercial power supply and outputs a control signal in response to the detection of power restoration to the interconnection control device 36. In response to the control signal from the UVR 34, the interconnection control device 36 instructs the storage battery PCS 21 to start synchronization between the voltage phase of the power from the storage battery PCS 21 and the voltage phase of the power from the commercial power supply (S22). For example, in S22, the interconnection control device 36 transmits a control signal, which is for giving an instruction to start phase synchronization, to the storage battery PCS 21 through the communication unit 38. In response to the control signal from the interconnection control device 36, the storage battery PCS 21 performs a phase synchronization process for synchronizing the voltage phase of the power from the storage battery PCS 21 and the voltage phase of the power from the commercial power supply with each other.

Figure 9:
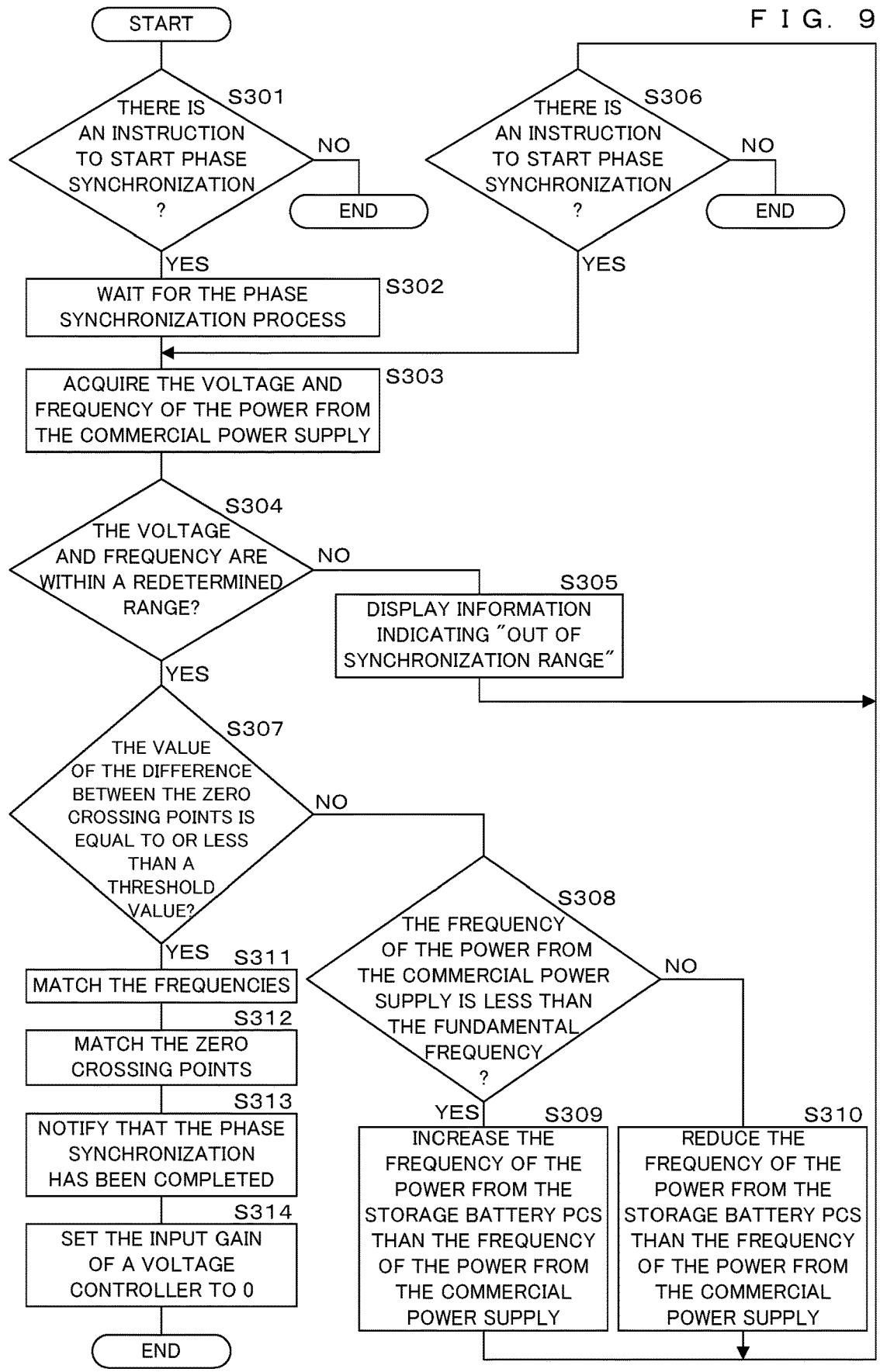
FIG. 9 is a flowchart illustrating an example of the procedure of a phase synchronization process performed by the storage battery PCS according to the first embodiment.

FIG. 9 is a flowchart illustrating an example of the procedure of the phase synchronization process performed by the storage battery PCS 21 according to the first embodiment. The following process is mainly performed by the control unit 211. The storage battery PCS 21 determines whether or not there is an instruction to start phase synchronization (S301). For example, when a control signal for giving an instruction to start phase synchronization is received by the communication unit 213, the storage battery PCS 21 determines that there is an instruction to start the phase synchronization. When a control signal for giving an instruction to start phase synchronization is not received by the communication unit 213 or when a control signal for canceling the start of the phase synchronization is received by the communication unit 213, the storage battery PCS 21 determines that there is no instruction to start the phase synchronization. When there is no instruction to start the phase synchronization (S301: NO), the storage battery PCS 21 ends the phase synchronization process. After the end of the phase synchronization process, the storage battery PCS 21 continues the independent operation, and repeats the processing from S301 at any time.

When there is an instruction to start the phase synchronization (S301: YES), the storage battery PCS 21 waits for the phase synchronization process for a predetermined time and continues the independent operation (S302). The waiting time (the predetermined time) is set in advance. For example, the waiting time is 300 seconds. Then, the storage battery PCS 21 acquires the voltage and frequency of the power from the commercial power supply (S303). In S303, for example, the storage battery PCS 21 receives the voltage and the frequency measured by the voltage transformer 35.

The storage battery PCS 21 may measure the voltage and frequency of the power from the commercial power supply.

Then, the storage battery PCS 21 determines whether or not the voltage and frequency of the power from the commercial power supply are within a predetermined range (S304). For example, the storage battery PCS 21 determines whether or not the voltage of the power from the commercial power supply exceeds a predetermined lower limit voltage and is less than a predetermined upper limit voltage. In addition, the storage battery PCS 21 determines whether or not the frequency of the power from the commercial power supply exceeds a predetermined lower limit frequency and is less than a predetermined upper limit frequency. The voltage and frequency ranges are ranges of the voltage and frequency of the power stably supplied from the commercial power supply when the power grid is normal, and are set in advance. For example, the lower limit voltage is the same as a voltage that triggers the operation of the UVR 34.

When the voltage or frequency of the power from the commercial power supply is not within the predetermined range (S304: NO), the storage battery PCS 21 displays information indicating "out of synchronization range" on the display unit 301 (S305). For example, the storage battery PCS 21 transmits information indicating "out of synchronization range" from the communication unit 213 to the display unit 301, and the display unit 301 receives the information from the storage battery PCS 21 through the communication unit 38 and displays a character image of "out of synchronization range". Then, the storage battery PCS 21 determines whether or not there is an instruction to start phase synchronization (S306). When there is no instruction to start the phase synchronization (S306: NO), the storage battery PCS 21 ends the phase synchronization process. After the end of the phase synchronization process, the storage battery PCS 21 continues the independent operation, and repeats the processing from S301 at any time.

When there is an instruction to start the phase synchronization (S306: YES), the storage battery PCS 21 returns the process to S303. By repeating the processing of S303 to S306, the storage battery PCS 21 waits for phase synchronization until the voltage or frequency of the power from the commercial power supply falls within a predetermined range, and continues the independent operation. In a state in which the independent operation is being performed, the storage battery PCS 21 continues the supply of power to the important load. At this time, the storage battery PCS 21 maintains the frequency of the power from the storage battery PCS 21 in the state of independent operation. When the power grid is unstable even though the power is restored, the voltage or frequency of the power from the commercial power supply deviates from the predetermined range. When the power grid becomes stabilized while the storage battery PCS 21 waits for phase synchronization and continues the independent operation, the voltage and frequency of the power from the commercial power supply can be stabilized within the predetermined range. Since the storage battery PCS 21 waits for phase synchronization and continues the independent operation, the commercial power supply in an unstable state is prevented from being connected to the important load, so that the stable power supply to the important load is continued.

When the voltage and frequency of the power from the commercial power supply are within the predetermined range (S304: YES), the storage battery PCS 21 determines whether or not the value of the difference between the zero crossing point of the voltage from the commercial power supply and the zero crossing point of the voltage from the storage battery PCS 21 is equal to or less than a threshold value (S307). The zero crossing point is the moment when the value of the AC voltage becomes zero, and the moment when the positive and negative of the AC voltage are reversed. In S305, for example, the storage battery PCS 21 measures times at the zero crossing point, and calculates the difference between the measured times. The threshold value is set in advance.

When the value of the difference between the zero crossing points exceeds the threshold value (S307: NO), the storage battery PCS 21 determines whether or not the frequency of the power from the commercial power supply is less than the fundamental frequency (S308). The fundamental frequency is set in advance. For example, the fundamental frequency is 50 Hz or 60 Hz.

When the frequency of the power from the commercial power supply is less than the fundamental frequency (S308: YES), the storage battery PCS 21 increases the frequency of the power from the storage battery PCS 21 by a predetermined amount than the frequency of the power from the commercial power supply (S309). The predetermined amount for increasing the frequency is set to a value sufficiently smaller than the fundamental frequency in advance. The predetermined amount is, for example, 0.02 Hz. Since the frequency of the power from the commercial power supply is relatively low, the storage battery PCS 21 slightly increases the frequency of the power from the storage battery PCS 21 by the processing of S309 so that the frequency does not deviate from the predetermined range.

When the frequency of the power from the commercial power supply is equal to or higher than the fundamental frequency (S308: NO), the storage battery PCS 21 reduces the frequency of the power from the storage battery PCS 21 by a predetermined amount than the frequency of the power from the commercial power supply (S310). The predetermined amount for reducing the frequency is set to a value sufficiently smaller than the fundamental frequency in advance, for example, 0.02 Hz. Since the frequency of the power from the commercial power supply is relatively high, the storage battery PCS 21 slightly reduces the frequency of the power from the storage battery PCS 21 by the processing of S310 so that the frequency does not deviate from the predetermined range. After the end of the processing of S309 or S310, the storage battery PCS 21 returns the process to S306.

When the value of the difference between the zero crossing points is equal to or less than the threshold value (S307: YES), the storage battery PCS 21 matches the frequency of the power from the storage battery PCS 21 with the frequency of the power from the commercial power supply (S311). Then, the storage battery PCS 21 matches the zero crossing point of the voltage from the storage battery PCS 21 with the zero crossing point of the voltage from the commercial power supply (S312). The control unit 211 stores in advance a table that defines the time change of the voltage forming a sine wave. In S312, the storage battery PCS 21 reads data corresponding to the zero crossing point of the table at the time of the zero crossing point of the voltage from the commercial power supply, and locks the zero crossing point of the voltage from the storage battery PCS 21 to the zero crossing point of the voltage from the commercial power supply.

When the zero crossing points are made to match in a state in which the difference between the zero crossing point of the voltage from the commercial power supply and the zero crossing point of the voltage from the storage battery PCS 21 is large, a phase jump occurs. In the processing of S307 to S312, by matching the zero crossing points in a state in which the difference between the zero crossing points is small, the occurrence of phase jump is suppressed, and the voltage phase of the power from the storage battery PCS 21 and the voltage phase of the power from the commercial power supply can be synchronized with each other. In addition, even when the frequency of the power from the commercial power supply and the frequency of the power from the storage battery PCS 21 are significantly different, the phase jump occurs. In the processing of S311 and S312, by matching the zero crossing points after matching the frequencies of the powers with each other, the occurrence of phase jump is suppressed, and the voltage phase of the power from the storage battery PCS 21 and the voltage phase of the power from the commercial power supply can be synchronized with each other.

Then, the storage battery PCS 21 notifies the interconnection control device 36 that the phase synchronization has been completed (S313). For example, the storage battery PCS 21 transmits a signal indicating the completion of phase synchronization from the communication unit 213 to the interconnection control device 36. Then, the storage battery PCS 21 sets the input gain of a voltage controller, which controls the voltage input to the power conversion unit 212, to 0 (S314).

During the independent operation, the storage battery PCS 21 performs voltage control by the voltage controller. When the power is supplied from the commercial power supply, the voltage is fixed by the commercial power supply. In S314, the storage battery PCS 21 stops the voltage control by setting the input gain of the voltage controller to 0. The voltage control by the storage battery PCS 21 is prevented from running out of control by making the storage battery PCS 21 control the fixed voltage. Since the processing of S314 is performed after the phase synchronization is completed, there is no large deviation between the voltage from the storage battery PCS 21 and the voltage from the commercial power supply due to the stop of the voltage control. Then, the storage battery PCS 21 ends the phase synchronization process.

After S22, the interconnection control device 36 determines whether or not the phase synchronization has been completed (S23). For example, when a signal indicating the completion of the phase synchronization is received through the communication unit 38, the interconnection control device 36 determines that the phase synchronization has been completed. When the signal indicating the completion of the phase synchronization is not received, the interconnection control device 36 determines that the phase synchronization has not been completed. When the phase synchronization has not been completed (S23: NO), the interconnection control device 36 determines whether or not the UVR 34 has detected a power failure of the commercial power supply (S24). For example, when a signal indicating a power failure is received from the UVR 34, the interconnection control device 36 determines that the UVR 34 has detected a power failure of the commercial power supply. When no power failure has been detected (S24: NO), the interconnection control device 36 returns the process to S23.

When a power failure has been detected (S24: YES), the interconnection control device 36 cancels the instruction to start the phase synchronization that is to be given to the storage battery PCS 21 (S25). In S25, for example, the interconnection control device 36 stops the transmission of a control signal for giving an instruction to start the phase synchronization, or transmits a control signal for canceling the start of the phase synchronization to the storage battery PCS 21 through the communication unit 38. In response to the processing of S25, the storage battery PCS 21 cancels the phase synchronization process. After the processing of S25, the interconnection control device 36 ends the process without resuming the supply of power from the commercial power supply. Thus, when a power failure occurs again while the storage battery PCS 21 is performing the phase synchronization process, the interconnection control device 36 causes the storage battery PCS 21 to stop the phase synchronization process. In this case, the supply of power from the commercial power supply is not resumed, and the grid interconnection system 100 continues the independent operation.

When the phase synchronization has been completed (S23: YES), the interconnection control device 36 stops the charge and discharge stands 41 to 45 (S26). In S26, the interconnection control device 36 outputs a control signal for stopping to the charge and discharge stands 41 to 45 through the communication unit 38. The charge and discharge stands 41 to 45 stop in response to the control signal.

Then, the interconnection control device 36 turns on the VCB 32 to connect the commercial power supply to the important load (S27). In S27, the interconnection control device 36 outputs a control signal for connecting the electric line to the VCB 32. The VCB 32 connects the electric line in response to the control signal. By connecting the electric line using the VCB 32, the commercial power supply is connected to the important load. Then, the interconnection control device 36 stops the storage battery PCS 21 (S28). In S28, the interconnection control device 36 outputs a control signal for stopping to the storage battery PCS 21 through the communication unit 38. The storage battery PCS 21 stops in response to the control signal. Then, the grid interconnection system 100 ends the process at the time of power restoration.

Figure 10:
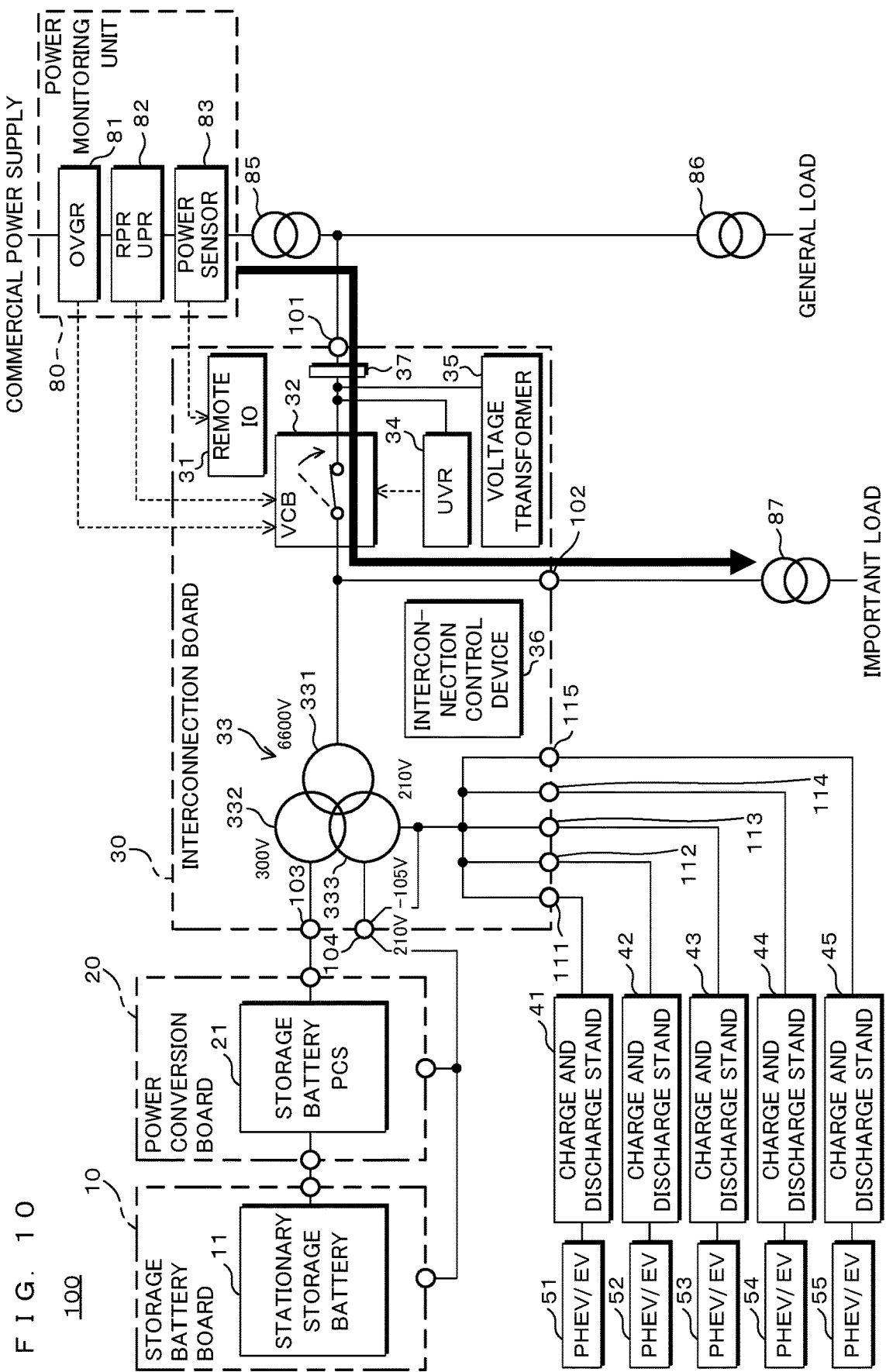
FIG. 10 is a schematic diagram illustrating an example of grid interconnection at the time of power restoration by the grid interconnection system according to the first embodiment.

FIG. 10 is a schematic diagram illustrating an example of grid interconnection at the time of power restoration by the grid interconnection system 100 according to the first embodiment. The grid interconnection system 100 connects the commercial power supply to the important load at the time of power restoration, so that the power is supplied from the commercial power supply to the important load. In the processing of S21 to S28, the grid interconnection system 100 connects the commercial power supply to the important load while supplying power from the storage battery PCS 21 to the important load, and then stops the storage battery PCS 21. Therefore, the supply of power to the important load is not interrupted. That is, the state in which power is being supplied from the storage battery PCS 21 to the important load is switched to the state in which power is being supplied from the commercial power supply to the important load without interruption. In this manner, the supply of power from the commercial power supply to the important load is resumed.

In addition, in the processing of S21 to S28, the commercial power supply is connected to the important load after the phase synchronization is performed. When the commercial power supply is connected to the important load while power is being supplied from the storage battery PCS 21 to the important load, the power from the storage battery PCS 21 and the power from the commercial power supply are simultaneously supplied to the important load. By performing phase synchronization, it is possible to connect the commercial power supply without giving stress, such as voltage fluctuation, to the important load. By stopping the storage battery PCS 21 while supplying both the powers simultaneously to the important load, it is possible to switch the power supply source for the important load without interrupting the supply of power.

After the end of the processing of S21 to S28, the interconnection control device 36 can restart the charge and discharge stands 41 to 45 and the storage battery PCS 21 in order to perform grid interconnection. Thereafter, the storage battery PCS 21 operates for grid interconnection. Then, the grid interconnection system 100 can perform the grid interconnection as described with reference to FIG. 4 or 5. Incidentally, in the processing of S21 to S28, the charge and discharge stands 41 to 45 are stopped before the supply of power from the commercial power supply to the important load is started, but the interconnection control device 36 may perform the process at the time of power restoration without performing the process of stopping the charge and discharge stands 41 to 45. In this case, the power supply source for the important load is switched without stopping the charge and discharge stands 41 to 45.

In the present embodiment, an example is shown in which the interconnection of the power grid is performed with a high voltage of 6600 V. However, the grid interconnection system 100 may perform the interconnection with a low voltage. In the case of low voltage, the power needs to be less than 50 kVA. Therefore, the voltage and the power (apparent power) on the first winding 331 side of the transformer 33 can be, for example, 210 V and 49 kVA, the voltage and the power (apparent power) on the second winding 332 side can be, for example, 300 V and 49 kVA, and the voltage and the power (apparent power) on the third winding 333 side can be, for example, 210 V and 49 kVA. In addition, the transformer is not limited to the three-winding transformer, and may be configured to include two two-winding transformers.

Incidentally, the grid interconnection system 100 may include power supply means, such as a solar cell, instead of the charge and discharge stands 41 to 45 or in addition to the charge and discharge stands 41 to 45. Also in this form, the grid interconnection system 100 can supply power from the storage battery PCS 21 to the important load in the event of a power failure, and can switch the power supply source for the important load without interrupting the supply of power at the time of power restoration.

Second Embodiment

In a second embodiment, the grid interconnection system 100 that does not include the charge and discharge stands 41 to 45 is shown. Although the first embodiment shows an example of the grid interconnection system 100 installed in the parking lot, the grid interconnection system 100 according to the second embodiment is installed in, for example, a building.

Figure 11:
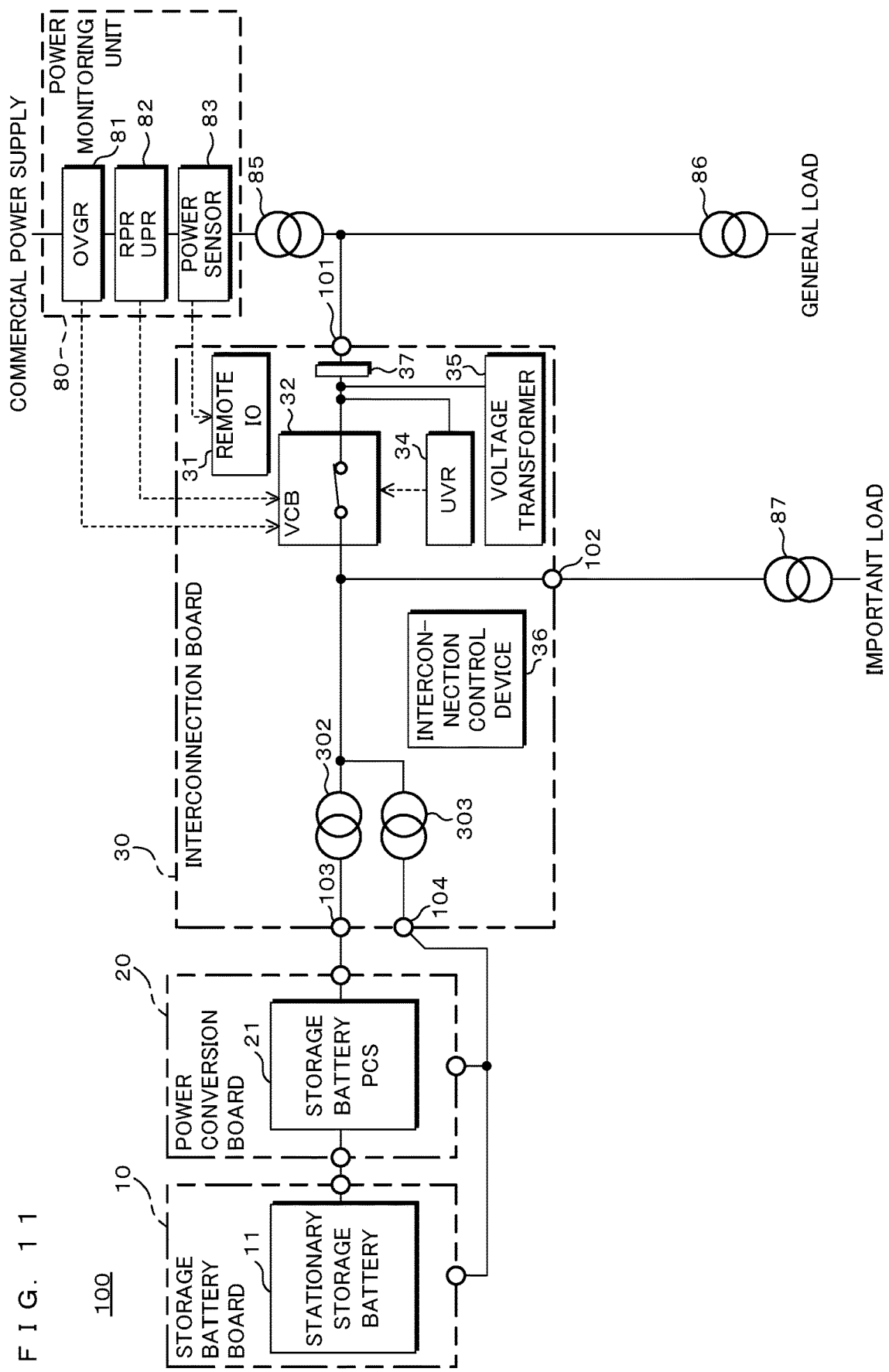
FIG. 11 is a schematic diagram illustrating an example of the circuit configuration of a grid interconnection system according to a second embodiment.

FIG. 11 is a schematic diagram illustrating an example of the circuit configuration of the grid interconnection system 100 according to the second embodiment. The grid interconnection system 100 does not include the charge and discharge stands 41 to 45 as compared with the first embodiment. The interconnection board 30 does not include the breakers 111 to 115 as compared with the first embodiment. In addition, the interconnection board 30 does not include the transformer 33 that is a three-winding transformer, but includes a transformer 302 and a transformer 303 that are two-winding transformers. The high voltage side of the transformer 302 is connected to the VCB 32 through the electric line. The low voltage side of the transformer 302 is connected to the breaker 103 through the electric line. The transformer 303 is connected between the high voltage side of the transformer 302 and the breaker 104. The power supplied to the storage battery PCS 21 and the power supplied from the storage battery PCS 21 are transformed by the transformer 302. The power transformed by the transformer 303 is supplied as a power supply for the control device and the cooling device included in the storage battery PCS 21, and further as a power supply for the control device, the cooling device, and the heating device in the storage battery board 10.

The configuration of the other parts of the interconnection board 30 is the same as that in the first embodiment. The configurations of the storage battery board 10, the power conversion board 20, the power monitoring unit 80, and the step-down transformers 85, 86, and 87 are the same as those in the first embodiment. The load is an electric device provided in a building. The general load is, for example, an electric device having a relatively small effect even if the power is cut off in the event of a disaster. The important load is an electric device to which power needs to be continuously supplied even in the event of an abnormality such as a disaster. For example, the important load is an emergency elevator or electric device that requires a continuous operation.

Figure 12:
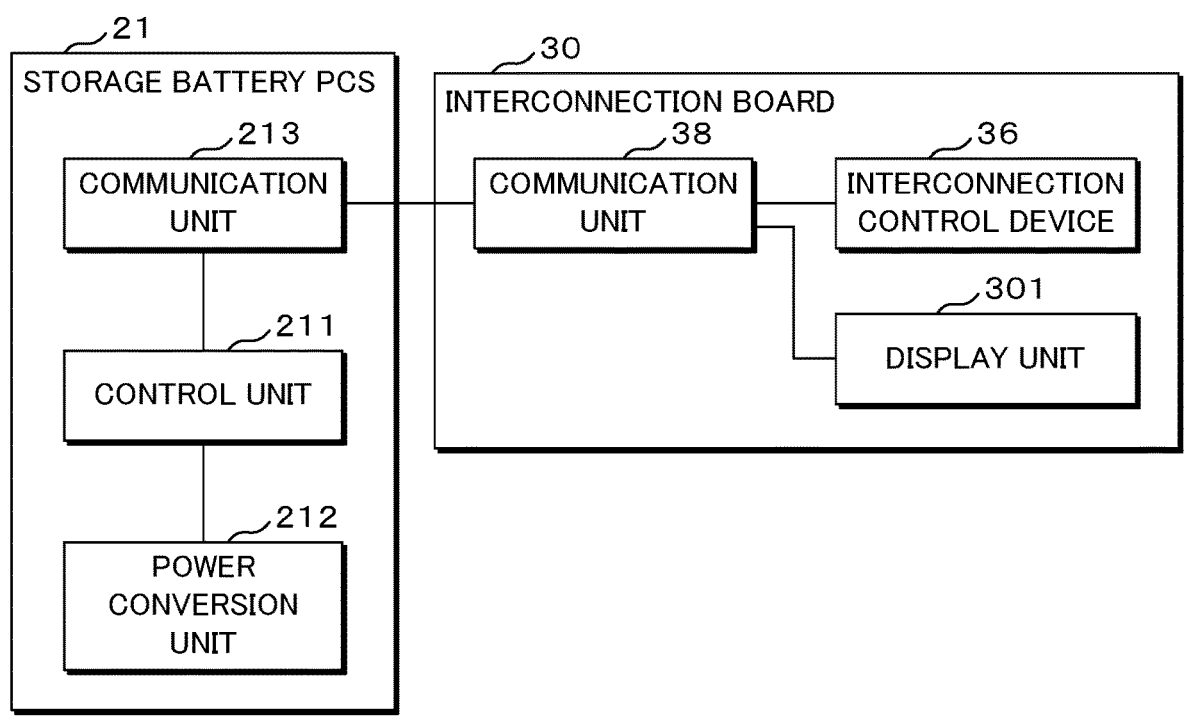
FIG. 12 is a block diagram illustrating an example of a communication connection mode of an interconnection board and a storage battery PCS according to the second embodiment and an example of the internal configuration of the storage battery PCS.

FIG. 12 is a block diagram illustrating an example of a communication connection mode of the interconnection board 30 and the storage battery PCS 21 according to the second embodiment and an example of the internal configuration of the storage battery PCS 21. Similar to the first embodiment, the interconnection board 30 includes the communication unit 38. The communication unit 38 is connected to the interconnection control device 36 by a communication line, and is also connected to the storage battery PCS 21 by a communication line. The configuration of the storage battery PCS 21 is the same as that in the first embodiment.

Figure 13:
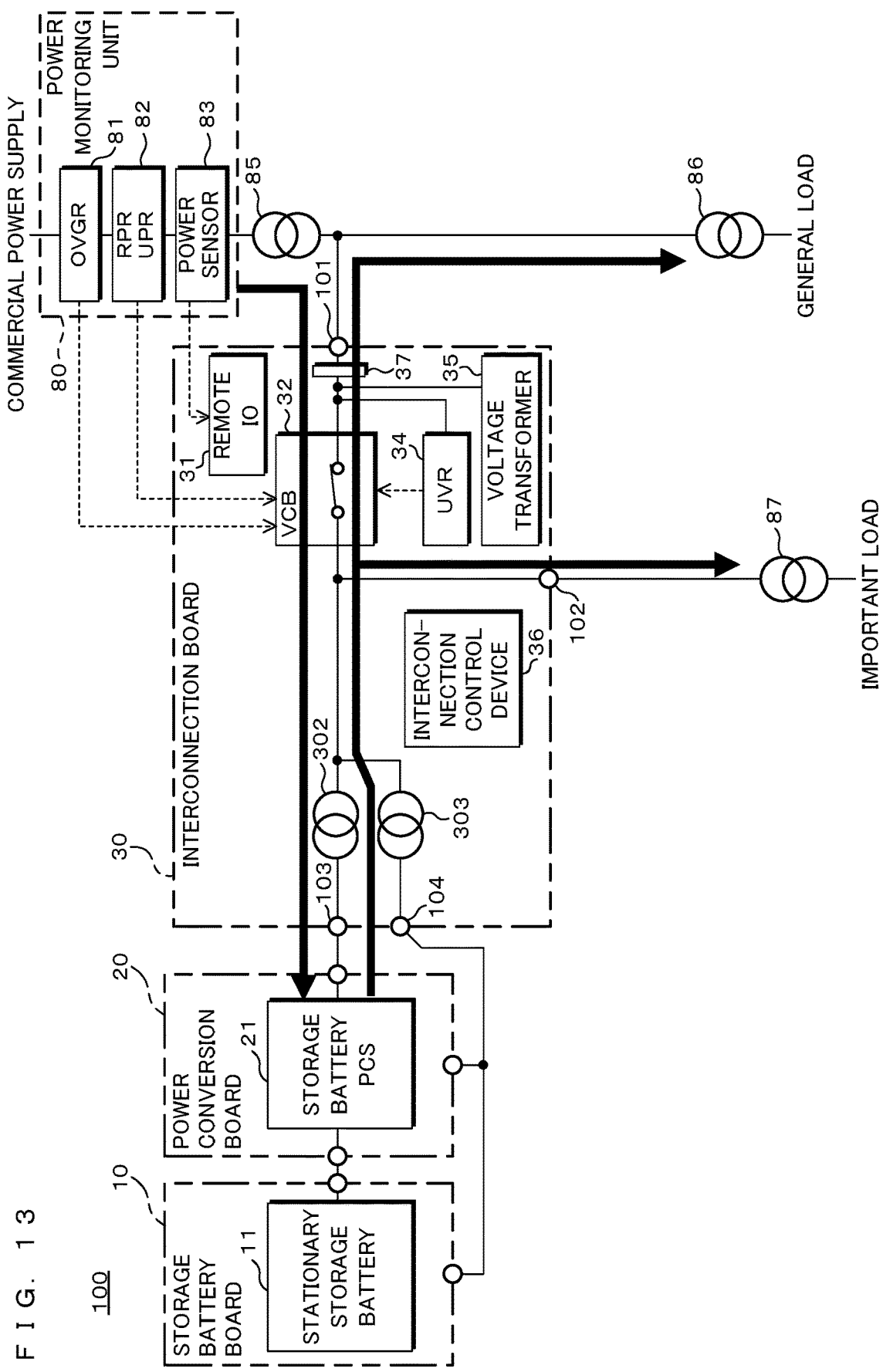
FIG. 13 is a schematic diagram illustrating an example of grid interconnection by the grid interconnection system according to the second embodiment when a power grid is normal.

FIG. 13 is a schematic diagram illustrating an example of grid interconnection by the grid interconnection system 100 according to the second embodiment when the power grid is normal. FIG. 13 illustrates the flow of a part of power by arrows. When the power grid is normal, the interconnection control device 36 can supply power from the commercial power supply to the storage battery PCS 21 to charge the storage battery PCS 21 with the stationary storage battery 11. When the power receiving point power at a predetermined location is equal to or higher than a threshold value, the interconnection control device 36 causes the storage battery PCS 21 to supply power to an important load and a general load so that the power receiving point power is equal to or less than the threshold value. When the power receiving point power at a predetermined location is equal to or less than the threshold value, power can be supplied from the power grid to the storage battery PCS 21 within a range not exceeding the threshold value. In addition, the grid interconnection system 100 can perform grid interconnection so that power is supplied from the commercial power supply to the general load and the important load when the power grid is normal.

Figure 14:
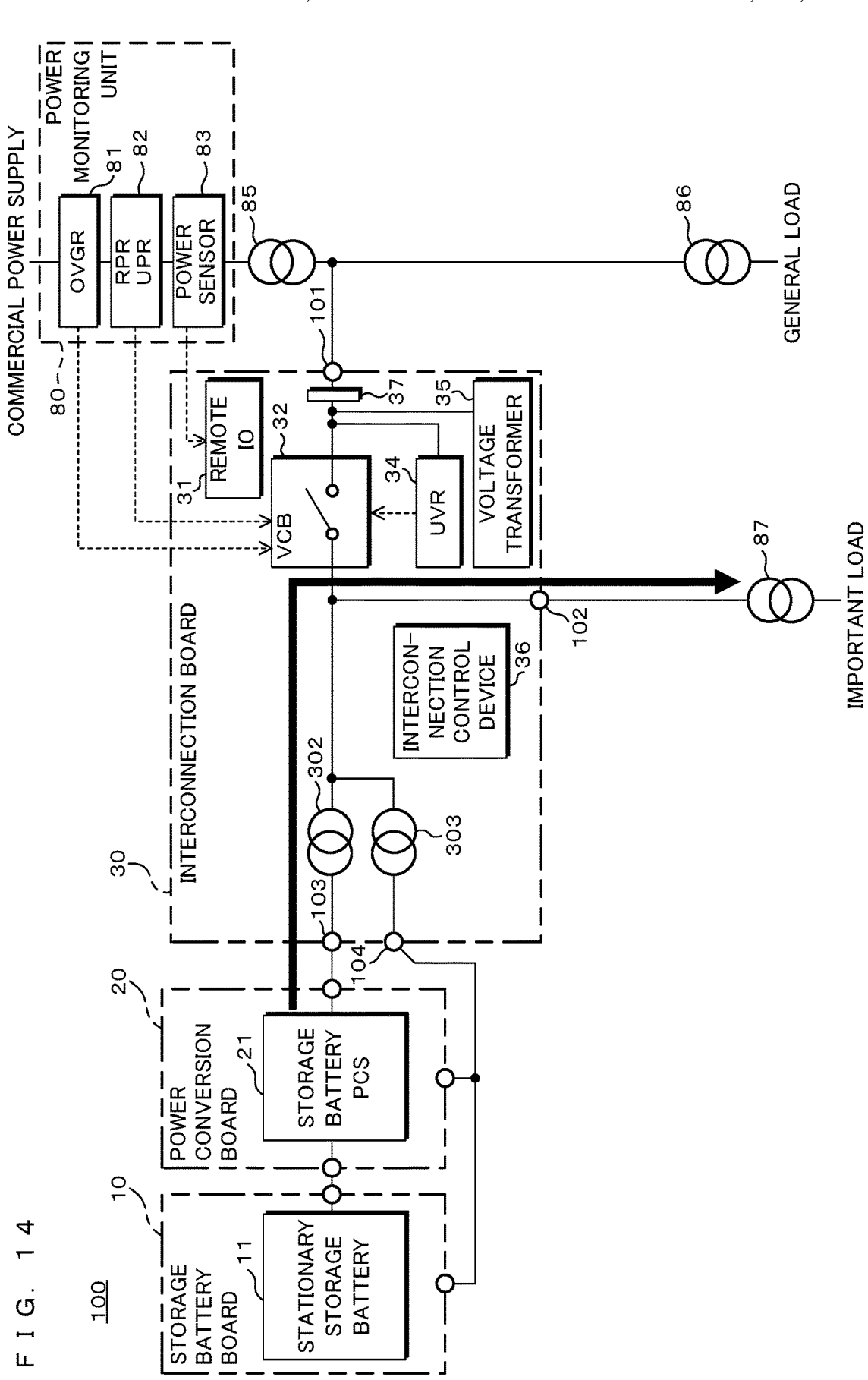
FIG. 14 is a schematic diagram illustrating an example of an independent operation in an emergency by the grid interconnection system according to the second embodiment.

FIG. 14 is a schematic diagram illustrating an example of an independent operation in an emergency by the grid interconnection system 100 according to the second embodiment. FIG. 14 illustrates the flow of power by arrows. When the power grid is abnormal, that is, when the commercial power supply fails, the interconnection control device 36 cuts off the electric line of the VCB 32 to disconnect the commercial power supply from the important load. Therefore, an independent operation by the interconnection control device 36 becomes possible. The interconnection control device 36 supplies power from the storage battery PCS 21 to the important load when the power grid is abnormal.

Figure 15:
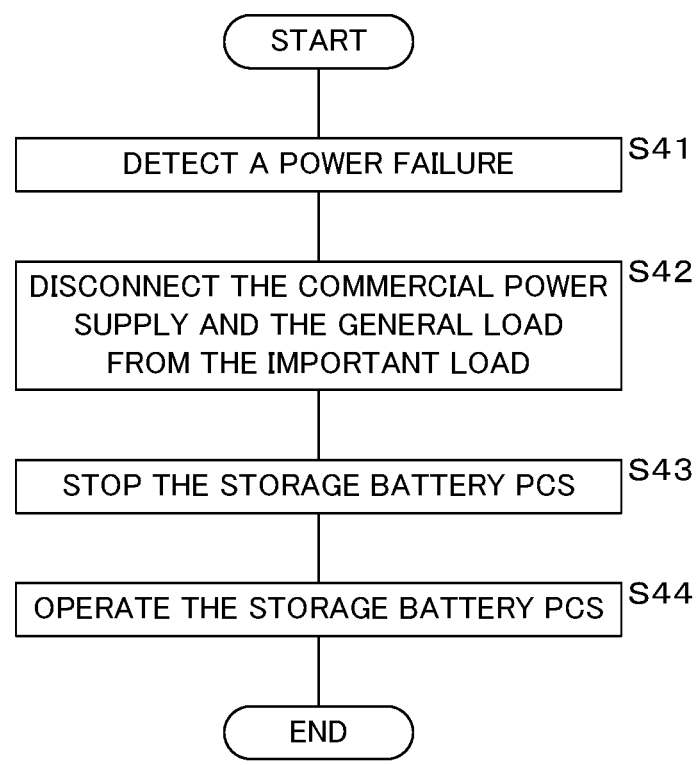
FIG. 15 is a flowchart illustrating an example of the procedure of a process for starting the independent operation by the grid interconnection system according to the second embodiment in the event of a power failure.

FIG. 15 is a flowchart illustrating an example of the procedure of a process for starting the independent operation by the grid interconnection system 100 according to the second embodiment in the event of a power failure. The UVR 34 detects a power failure of the commercial power supply based on a voltage from the commercial power supply (S41). The UVR 34 outputs a control signal for cutting off the electric line to the VCB 32 and the VCB 32 cuts off the electric line, so that the grid interconnection system 100 disconnects the commercial power supply and the general load from the important load (S42).

Then, the interconnection control device 36 stops the storage battery PCS 21 (S43). In S43, the interconnection control device 36 outputs a control signal for stopping to the storage battery PCS 21, and the storage battery PCS 21 stops in response to the control signal. Then, the interconnection control device 36 operates the storage battery PCS 21 (S44). In S44, the interconnection control device 36 outputs a control signal for starting an operation in the independent operation mode to the storage battery PCS 21, and the storage battery PCS 21 starts the operation in response to the control signal. Thereafter, the storage battery PCS 21 operates independently. The interconnection control device 36 receives signals indicating the detection of a power failure by the UVR 34, the cut-off of the electric line by the VCB 32, and the stopping of the storage battery PCS 21. After receiving all of these signals, the interconnection control device 36 performs the processing of S44. The grid interconnection system 100 ends the process of starting the independent operation.

After the grid interconnection system 100 starts the independent operation, power is supplied from the storage battery PCS 21 to the important load as illustrated in FIG. 14. When the interconnection control device 36 performs an independent operation, the storage battery PCS 21 performs voltage control to operate as a voltage source. In this manner, the grid interconnection system 100 can supply the required power to the important load by supplying the power from the storage battery PCS 21 in the event of a power failure.

FIG. 16 is a flowchart illustrating an example of the procedure of a process performed by the grid interconnection system 100 according to the second embodiment at the time of power restoration. The UVR 34 detects the power restoration of the commercial power supply based on a voltage from the commercial power supply (S51). The UVR 34 outputs a control signal according to the detection of the power restoration to the interconnection control device 36, and the interconnection control device 36 instructs the storage battery PCS 21 to start synchronization between the voltage phase of the power from the storage battery PCS 21 and the voltage phase of the power from the commercial power supply (S52). The storage battery PCS 21 performs a phase synchronization process for synchronizing the voltage phase of the power from the storage battery PCS 21 and the voltage phase of the power from the commercial power supply with each other. The content of the phase synchronization process is the same as that in the first embodiment. When the phase synchronization is completed, the storage battery PCS 21 notifies the interconnection control device 36 that the phase synchronization has been completed.

After S52, the interconnection control device 36 determines whether or not the phase synchronization has been completed (S53). For example, when a signal indicating the completion of the phase synchronization is received through the communication unit 38, the interconnection control device 36 determines that the phase synchronization has been completed. When the phase synchronization has not been completed (S53: NO), the interconnection control device 36 determines whether or not the UVR 34 has detected a power failure of the commercial power supply (S54). When no power failure has been detected (S54: NO), the interconnection control device 36 returns the process to S53.

When a power failure has been detected (S54: YES), the interconnection control device 36 cancels the instruction to start the phase synchronization that is to be given to the storage battery PCS 21 (S55). In response to the processing of S55, the storage battery PCS 21 cancels the phase synchronization process. After the processing of S55, the interconnection control device 36 ends the process without resuming the supply of power from the commercial power supply. Thus, when a power failure occurs again while the storage battery PCS 21 is performing the phase synchronization process, the supply of power from the commercial power supply is not resumed, and the grid interconnection system 100 continues the independent operation.

When the phase synchronization has been completed (S53: YES), the interconnection control device 36 turns on the VCB 32 to connect the commercial power supply to the important load (S56). In S56, the interconnection control device 36 outputs a control signal for connecting the electric line to the VCB 32, and the VCB 32 connects the electric line. As a result, the commercial power is connected to the important load. Then, the interconnection control device 36 stops the storage battery PCS 21 (S57). Then, the grid interconnection system 100 ends the process at the time of power restoration.

Figure 17:
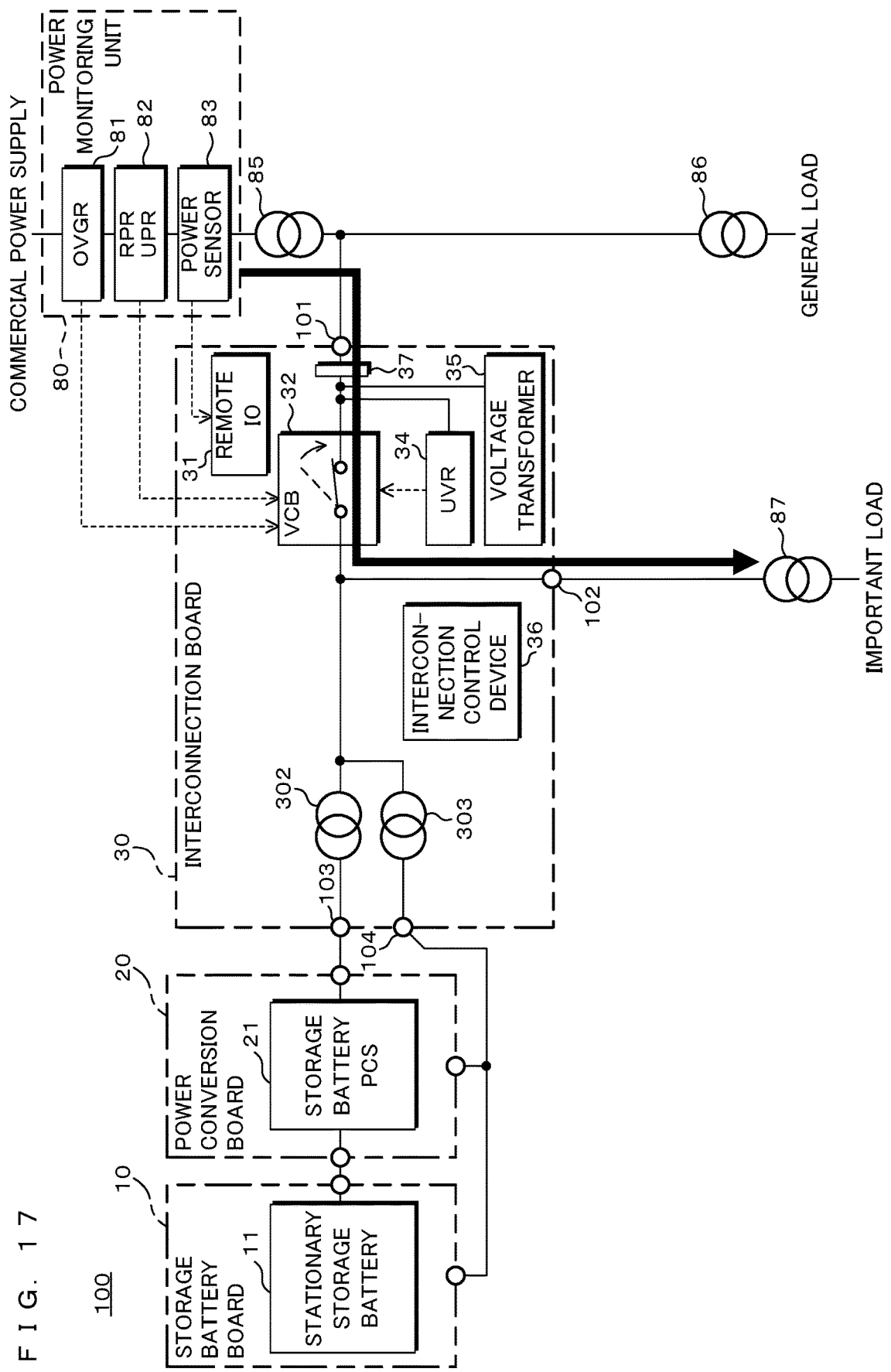
FIG. 17 is a schematic diagram illustrating an example of grid interconnection at the time of power restoration by the grid interconnection system according to the second embodiment.

FIG. 17 is a schematic diagram illustrating an example of grid interconnection at the time of power restoration by the grid interconnection system 100 according to the second embodiment. The grid interconnection system 100 connects the commercial power supply to the important load at the time of power restoration, so that the power is supplied from the commercial power supply to the important load. In the processing of S51 to S57, the grid interconnection system 100 switches the state in which power is being supplied from the storage battery PCS 21 to the important load to the state in which power is being supplied from the commercial power supply to the important load without interruption. In this manner, the supply of power from the commercial power supply to the important load is resumed.

After the end of the processing of S51 to S57, the interconnection control device 36 can restart the storage battery PCS 21 in order to perform grid interconnection. Thereafter, the storage battery PCS 21 operates for grid interconnection. Then, the grid interconnection system 100 can perform the grid interconnection as described with reference to FIG. 13.

As described above, also in the second embodiment, the grid interconnection system 100 can supply power from the storage battery PCS 21 to the important load in the event of a power failure, and can switch the power supply source for the important load without interrupting the supply of power at the time of power restoration. Incidentally, in the second embodiment, a three-winding transformer may be provided instead of the transformer 302 and the transformer 303 that are two-winding transformers. In addition, the grid interconnection system 100 may include a plurality of storage battery boards 10 and a plurality of power conversion board 20, so that the power is supplied from a plurality of storage battery PCS 21.

Third Embodiment

In a third embodiment, an example of the grid interconnection system 100 for industrial use is shown. The grid interconnection system 100 according to the third embodiment forms a part of a factory energy management system (FEMS). The grid interconnection system 100 is installed in a factory.

Figure 18:
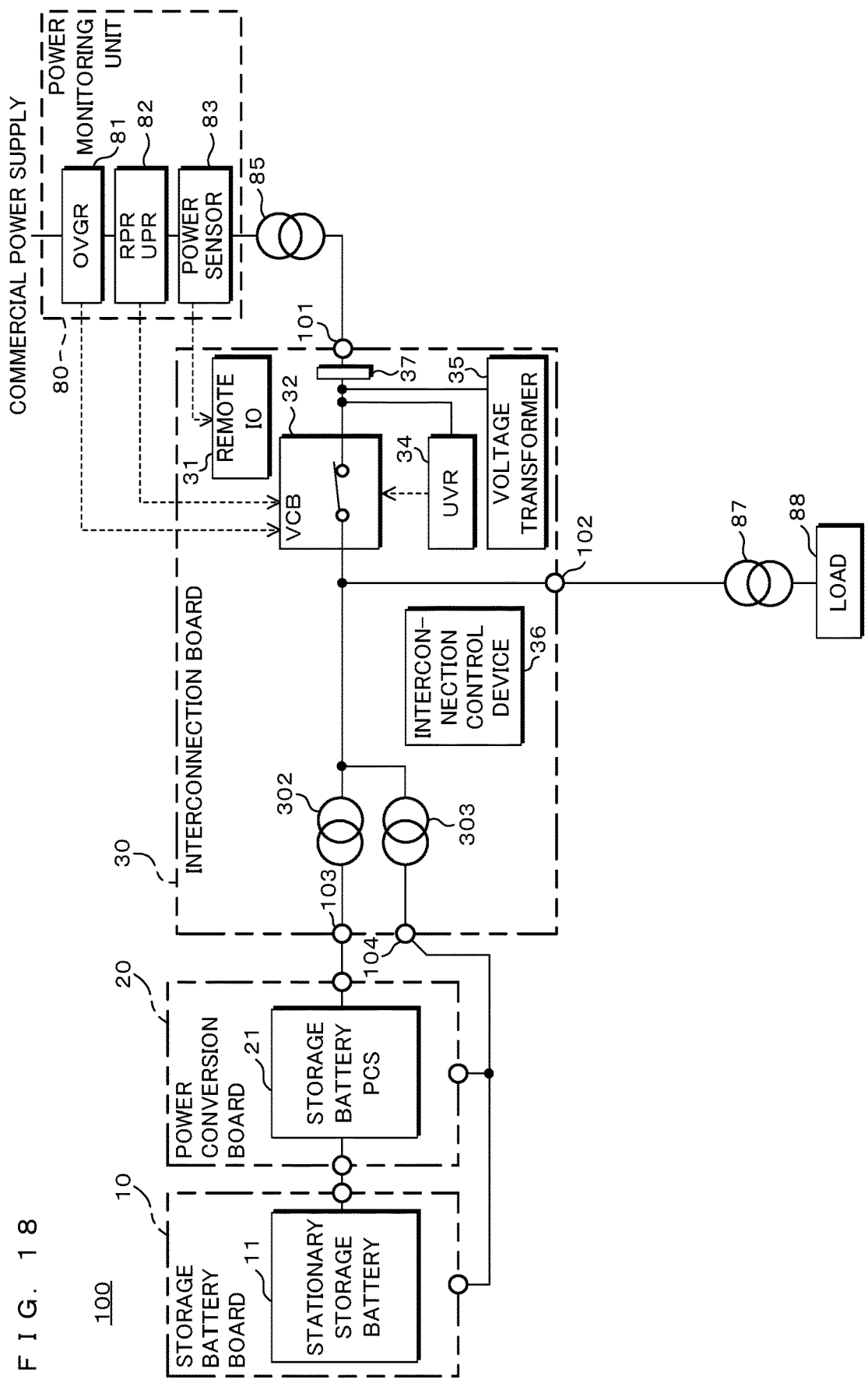
FIG. 18 is a schematic diagram illustrating an example of the circuit configuration of a grid interconnection system according to a third embodiment.

FIG. 18 is a schematic diagram illustrating an example of the circuit configuration of the grid interconnection system 100 according to the third embodiment. The configurations of the interconnection board 30, the storage battery board 10, the power conversion board 20, the power monitoring unit 80, and the step-down transformers 85 and 87 are the same as those in the second embodiment. The grid interconnection system 100 does not include the step-down transformer 86 as compared with the second embodiment. The step-down transformer 87 is connected to a load 88. The load 88 is an electric device provided in the factory. For example, the load 88 is factory equipment or lighting.

The communication connection mode of the interconnection board 30 and the storage battery PCS 21 and the internal configuration of the storage battery PCS 21 are the same as those in the second embodiment. When the storage battery PCS 21 is operating, a signal indicating that the storage battery PCS 21 is operating is transmitted from the communication unit 213. The interconnection control device 36 receives a signal indicating that the storage battery PCS 21 is operating through the communication unit 38.

Figure 19:
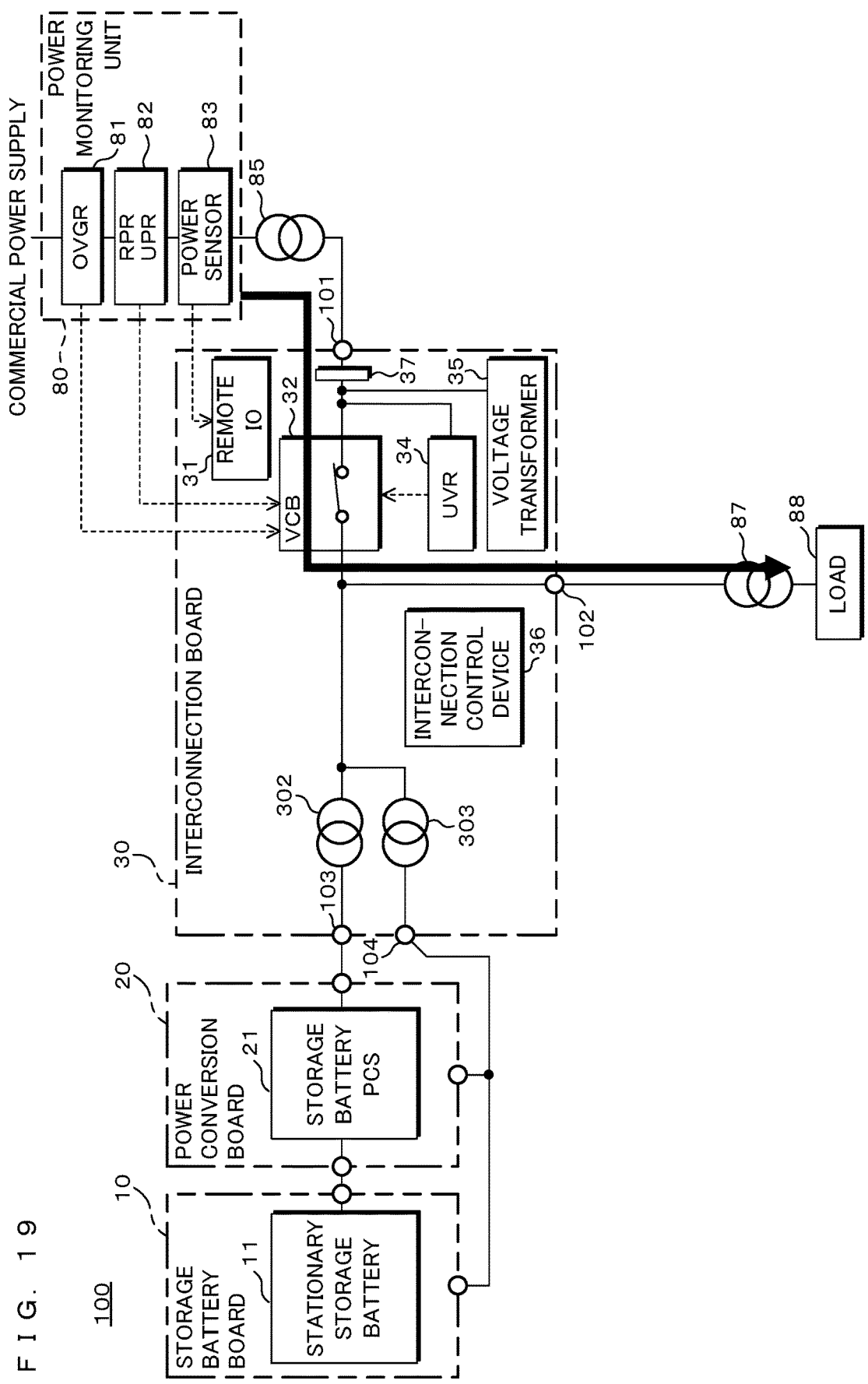
FIG. 19 is a schematic diagram illustrating a first example of grid interconnection by the grid interconnection system according to the third embodiment when a power grid is normal.

FIG. 19 is a schematic diagram illustrating a first example of grid interconnection by the grid interconnection system 100 according to the third embodiment when the power grid is normal. FIG. 19 illustrates the flow of a part of power by arrows. The interconnection control device 36 performs grid interconnection so that power is supplied from the commercial power supply to the load 88 when the power grid is normal.

Figure 20:
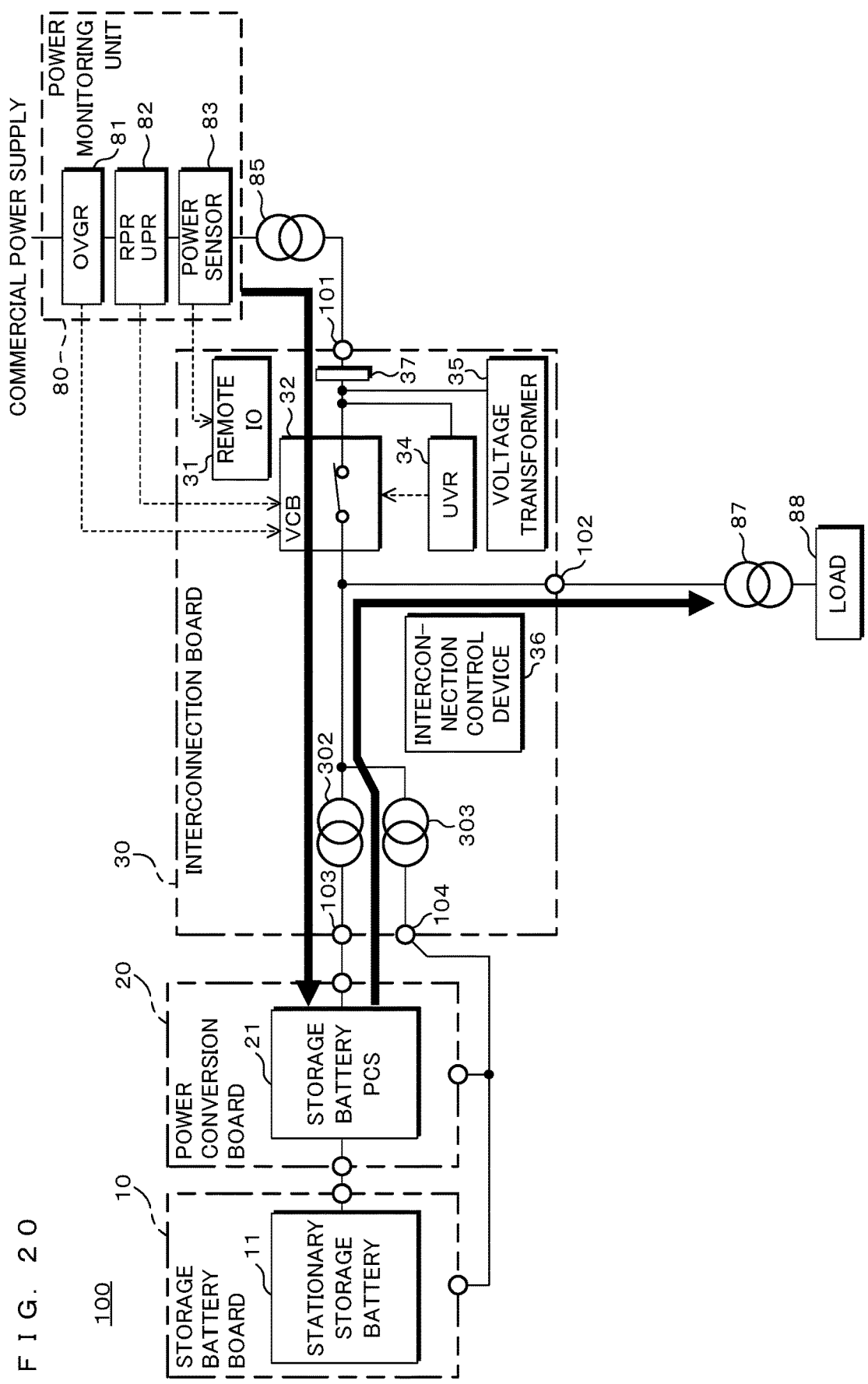
FIG. 20 is a schematic diagram illustrating a second example of grid interconnection by the grid interconnection system according to the third embodiment when a power grid is normal.

FIG. 20 is a schematic diagram illustrating a second example of grid interconnection by the grid interconnection system 100 according to the third embodiment when the power grid is normal. FIG. 20 illustrates the flow of a part of power by arrows. The interconnection control device 36 causes the storage battery PCS 21 to supply power to the load 88. In addition, the interconnection control device 36 can supply power from the commercial power supply to the storage battery PCS 21 to charge the storage battery PCS 21 with the stationary storage battery 11.

Figure 21:
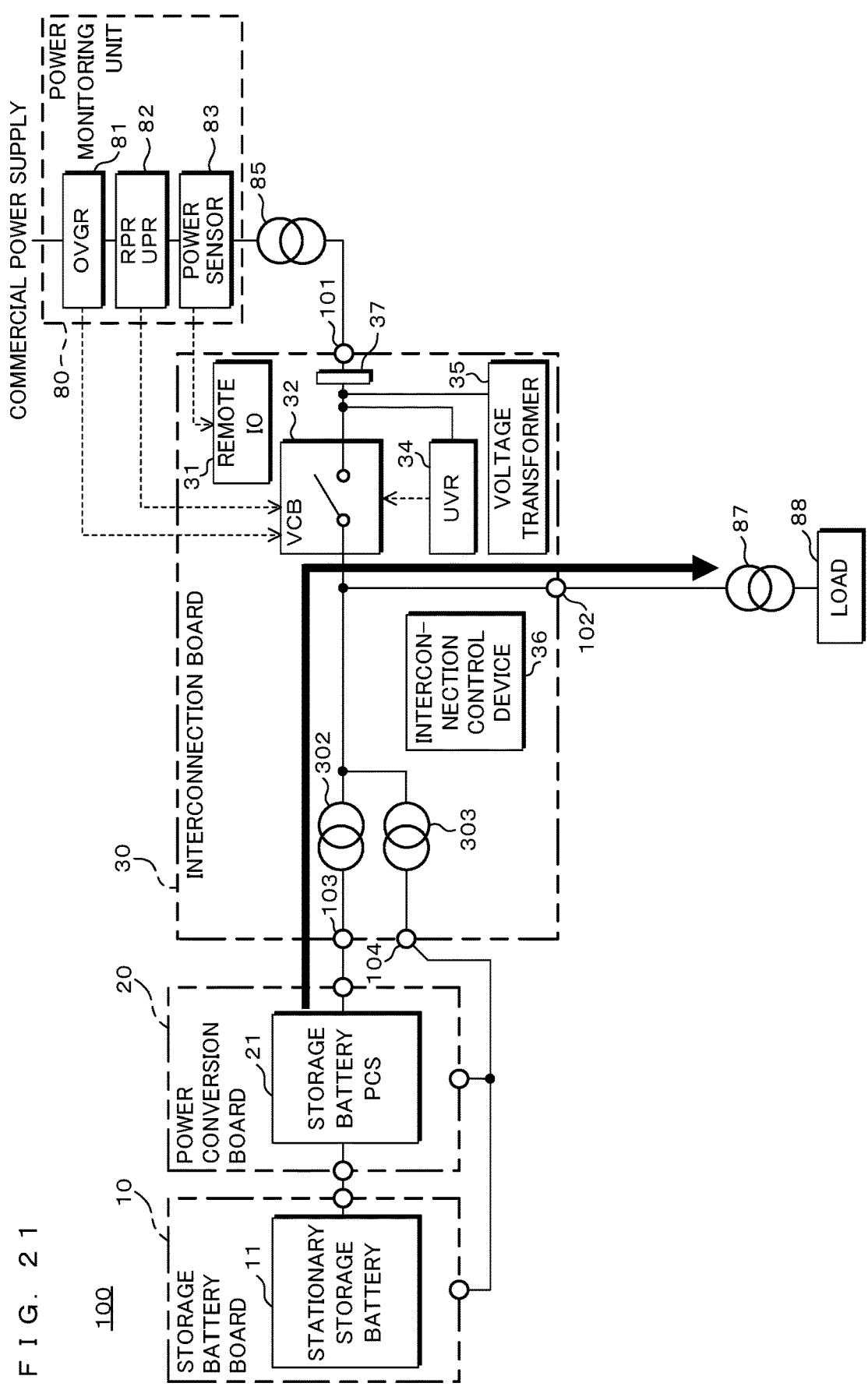
FIG. 21 is a schematic diagram illustrating an example of an independent operation in an emergency by the grid interconnection system according to the third embodiment.

FIG. 21 is a schematic diagram illustrating an example of an independent operation in an emergency by the grid interconnection system 100 according to the third embodiment. FIG. 21 illustrates the flow of power by arrows. When the power grid is abnormal, that is, when the commercial power supply fails, the interconnection control device 36 cuts off the electric line of the VCB 32 to disconnect the commercial power supply from the important load. Therefore, an independent operation by the interconnection control device 36 becomes possible. The interconnection control device 36 supplies power from the storage battery PCS 21 to the important load when the power grid is abnormal.

Figure 22:
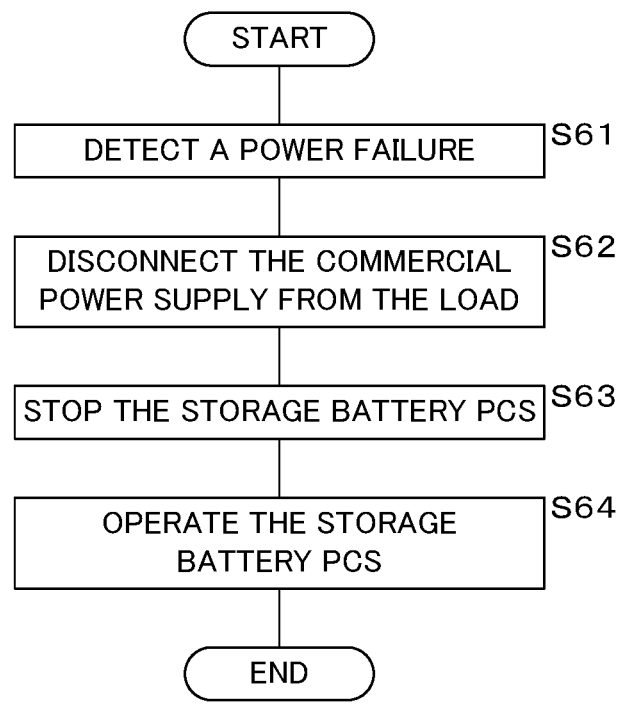
FIG. 22 is a flowchart illustrating an example of the procedure of a process for starting the independent operation by the grid interconnection system according to the third embodiment in the event of a power failure.

FIG. 22 is a flowchart illustrating an example of the procedure of a process for starting the independent operation by the grid interconnection system 100 according to the third embodiment in the event of a power failure. The UVR 34 detects a power failure of the commercial power supply based on a voltage from the commercial power supply (S61). The LVR 34 outputs a control signal for cutting off the electric line to the VCB 32 and the VCB 32 cuts off the electric line, so that the grid interconnection system 100 disconnects the commercial power supply from the load 88 (S62).

Then, the interconnection control device 36 stops the storage battery PCS 21 (S63). In S63, the interconnection control device 36 outputs a control signal for stopping to the storage battery PCS 21, and the storage battery PCS 21 stops in response to the control signal. Then, the interconnection control device 36 operates the storage battery PCS 21 (S64). In S64, the interconnection control device 36 outputs a control signal for starting an operation in the independent operation mode to the storage battery PCS 21, and the storage battery PCS 21 starts the operation in response to the control signal. Thereafter, the storage battery PCS 21 operates independently. The interconnection control device 36 receives signals indicating the detection of a power failure by the UVR 34, the cut-off of the electric line by the VCB 32, and the stopping of the storage battery PCS 21. After receiving all of these signals, the interconnection control device 36 performs the processing of S64. The grid interconnection system 100 ends the process of starting the independent operation.

After the grid interconnection system 100 starts the independent operation, power is supplied from the storage battery PCS 21 to the load 88 as illustrated in FIG. 21. When the interconnection control device 36 performs an independent operation, the storage battery PCS 21 performs voltage control to operate as a voltage source. In this manner, the grid interconnection system 100 can supply the required power to the load 88 by supplying the power from the storage battery PCS 21 in the event of a power failure. Therefore, even in the event of a power failure, power is supplied to the load 88 in the factory, so that the operation of the factory is prevented from being stopped.

FIG. 23 is a flowchart illustrating an example of the procedure of a process performed by the grid interconnection system 100 according to the third embodiment at the time of power restoration. The UVR 34 detects the power restoration of the commercial power supply based on a voltage from the commercial power supply (S71). Then, the interconnection control device 36 instructs the storage battery PCS 21 to start synchronization between the voltage phase of the power from the storage battery PCS 21 and the voltage phase of the power from the commercial power supply (S72). The storage battery PCS 21 performs a phase synchronization process for synchronizing the voltage phase of the power from the storage battery PCS 21 and the voltage phase of the power from the commercial power supply with each other. The content of the phase synchronization process is the same as that in the first and second embodiments. When the phase synchronization is completed, the storage battery PCS 21 notifies the interconnection control device 36 that the phase synchronization has been completed.

After S72, the interconnection control device 36 determines whether or not the phase synchronization has been completed (S73). When the phase synchronization has not been completed (S73: NO), the interconnection control device 36 determines whether or not the UVR 34 has detected a power failure of the commercial power supply (S74). When no power failure has been detected (S74: NO), the interconnection control device 36 returns the process to S73. When a power failure has been detected (S74: YES), the interconnection control device 36 cancels the instruction to start the phase synchronization that is to be given to the storage battery PCS 21 (S75). In response to the processing of S75, the storage battery PCS 21 cancels the phase synchronization process. After the processing of S75, the interconnection control device 36 ends the process without resuming the supply of power from the commercial power supply. Thus, when a power failure occurs again during the phase synchronization process, the supply of power from the commercial power supply is not resumed, and the grid interconnection system 100 continues the independent operation.

When the phase synchronization has been completed (S73: YES), the interconnection control device 36 turns on the VCB 32 to connect the commercial power supply to the load 88 (S76). In S76, the VCB 32 connects the electric line, so that the commercial power supply is connected to the load 88. Then, the interconnection control device 36 stops the storage battery PCS 21 (S77). Then, the grid interconnection system 100 ends the process at the time of power restoration.

After the end of the process at the time of power restoration, as illustrated in FIG. 19, the commercial power supply is connected to the load 88, so that the power is supplied from the commercial power supply to the load 88. In the processing of S71 to S77, the grid interconnection system 100 switches the state in which power is being supplied from the storage battery PCS 21 to the load 88 to the state in which power is being supplied from the commercial power supply to the load 88 without interruption. In this manner, the supply of power from the commercial power supply to the load 88 is resumed.

After the end of the processing of S51 to S57, the interconnection control device 36 can restart the storage battery PCS 21 in order to perform grid interconnection. Thereafter, the storage battery PCS 21 operates for grid interconnection. Then, the grid interconnection system 100 can perform the grid interconnection as described with reference to FIG. 20.

As described above, also in the third embodiment, the grid interconnection system 100 can supply power from the storage battery PCS 21 to the load 88 in the event of a power failure, and can switch the power supply source for the load 88 without interrupting the supply of power at the time of power restoration. Therefore, at the time of power restoration, the supply of power to the load 88 in the factory is not interrupted, so that the operation of the factory is prevented from being interrupted. Incidentally, in the third embodiment, a three-winding transformer may be provided instead of the transformer 302 and the transformer 303 that are two-winding transformers. In addition, the grid interconnection system 100 may include a plurality of storage battery boards 10 and a plurality of power conversion board 20, so that the power is supplied from a plurality of storage battery PCS 21.

The present invention is not limited to the content of the above-described embodiments, and various changes can be made within the scope of the claims. That is, embodiments obtained by combining technical means appropriately changed within the scope of the claims are also included in the technical scope of the present invention.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A grid interconnection system for a power grid, comprising:
   a storage battery;
   a power conversion device that converts power from the storage battery into AC; and
   an interconnection control device that supplies power from a commercial power supply to a load and supplies power from the power conversion device to the load when the commercial power supply fails,
   wherein, when the commercial power supply is restored, the interconnection control device starts supply of power from the commercial power supply to the load, and stops supply of power from the power conversion device to the load after the supply of power from the commercial power supply to the load is started,
   wherein, when the commercial power supply is restored, the power conversion device synchronizes a voltage phase of power supplied from the power conversion device to the load with a voltage phase of power from the commercial power supply, and
   after the voltage phase of the power supplied from the power conversion device to the load is synchronized with the voltage phase of the power from the commercial power supply, the interconnection control device starts supply of power from the commercial power supply to the load,
   wherein, in order to synchronize the voltage phase of the power supplied from the power conversion device to the load with the voltage phase of the power from the commercial power supply, the power conversion device matches a frequency of the power supplied from the power conversion device to the load with a frequency of the power from the commercial power supply, and
   after the matching between the frequencies of the powers, the power conversion device matches a zero crossing point of the power supplied from the power conversion device to the load with a zero crossing point of the power from the commercial power supply.

2. The grid interconnection system according to claim 1, further comprising:
   a charge and discharge stand for an electric-powered vehicle,
   wherein, when the commercial power supply fails, the interconnection control device supplies power from the power conversion device and the charge and discharge stand to the load.

3. The grid interconnection system according to claim 1, wherein, when the commercial power supply fails, the interconnection control device supplies power from the power conversion device to a specific load, and
   when the commercial power supply is restored, the interconnection control device starts supply of power from the commercial power supply to the specific load.

4. A grid interconnection method for a power grid, comprising:
   by using a storage battery and a power conversion device for converting power from the storage battery into AC, supplying power from a commercial power supply to a load;
   supplying power from the power conversion device to the load when the commercial power supply fails;
   causing the power conversion device to synchronize a voltage phase of power supplied from the power conversion device to the load with a voltage phase of power from the commercial power supply when the commercial power supply is restored;

starting supply of power from the commercial power supply to the load after the voltage phase of the power supplied from the power conversion device to the load is synchronized with the voltage phase of the power from the commercial power supply; and stopping the supply of power from the power conversion device to the load after the supply of power from the commercial power supply to the load is started, wherein, in order to synchronize the voltage phase of the power supplied from the power conversion device to the load with the voltage phase of the power from the commercial power supply, matching a frequency of the power supplied from the power conversion device to the load with a frequency of the power from the commercial power supply, and after the matching between the frequencies of the powers, matching a zero crossing point of the power supplied from the power conversion device to the load with a zero crossing point of the power from the commercial power supply.

5. A grid interconnection system for a power grid, comprising:

a storage battery;

a power conversion device that converts power from the storage battery into AC; and an interconnection control device that supplies power from a commercial power supply to a load and supplies power from the power conversion device to the load when the commercial power supply fails, wherein, when the commercial power supply is restored, the interconnection control device starts supply of power from the commercial power supply to the load, and stops supply of power from the power conversion device to the load after the supply of power from the commercial power supply to the load is started, wherein, when the commercial power supply is restored, the power conversion device synchronizes a voltage phase of power supplied from the power conversion device to the load with a voltage phase of power from the commercial power supply, and after the voltage phase of the power supplied from the power conversion device to the load is synchronized with the voltage phase of the power from the commercial power supply, the interconnection control device starts supply of power from the commercial power supply to the load, wherein, the power conversion device determines whether or not a voltage and a frequency of the power from the commercial power supply are within a predetermined range, when the voltage and the frequency are within the predetermined range, the power conversion device synchronizes the voltage phase of the power supplied from the power conversion device to the load with the voltage phase of the power from the commercial power supply, and when the voltage or the frequency is not within the predetermined range, the power conversion device waits for a process for phase synchronization and continues supply of power to the load.

6. The grid interconnection system according to claim 5, further comprising:

a charge and discharge stand for an electric-powered vehicle, wherein, when the commercial power supply fails, the interconnection control device supplies power from the power conversion device and the charge and discharge stand to the load.

7. The grid interconnection system according to claim 5, wherein, when the commercial power supply fails, the interconnection control device supplies power from the power conversion device to a specific load, and when the commercial power supply is restored, the interconnection control device starts supply of power from the commercial power supply to the specific load.

8. A grid interconnection method for a power grid, comprising:

by using a storage battery and a power conversion device for converting power from the storage battery into AC, supplying power from a commercial power supply to a load;

supplying power from the power conversion device to the load when the commercial power supply fails;

causing the power conversion device to synchronize a voltage phase of power supplied from the power conversion device to the load with a voltage phase of power from the commercial power supply when the commercial power supply is restored;

starting supply of power from the commercial power supply to the load after the voltage phase of the power supplied from the power conversion device to the load is synchronized with the voltage phase of the power from the commercial power supply; and stopping the supply of power from the power conversion device to the load after the supply of power from the commercial power supply to the load is started, wherein, determining whether or not a voltage and a frequency of the power from the commercial power supply are within a predetermined range, when the voltage and the frequency are within the predetermined range, synchronizing the voltage phase of the power supplied from the power conversion device to the load with the voltage phase of the power from the commercial power supply, and when the voltage or the frequency is not within the predetermined range, waiting for a process for phase synchronization and continues supply of power to the load.

* * * * *